(12) United States Patent
Maskatia et al.

(10) Patent No.: US 9,785,996 B2
(45) Date of Patent: *Oct. 10, 2017

(54) SYSTEM AND METHOD FOR SUBSTITUTING A MEDIA ARTICLE WITH ALTERNATIVE MEDIA

(71) Applicant: Redbox Automated Retail, LLC, Oakbrook Terrace, IL (US)

(72) Inventors: Imran Maskatia, Milpitas, CA (US); Jason Rubinstein, Lake Forest, IL (US)

(73) Assignee: Redbox Automated Retail, LLC, Oakbrook Terrace, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/062,920

(22) Filed: Mar. 7, 2016

(65) Prior Publication Data

US 2016/0253736 A1 Sep. 1, 2016

Related U.S. Application Data

(63) Continuation of application No. 13/517,565, filed on Jun. 13, 2012, now Pat. No. 9,280,787.

(Continued)

(51) Int. Cl.
*G07F 11/00* (2006.01)
*G06Q 30/06* (2012.01)
*G07F 17/00* (2006.01)

(52) U.S. Cl.
CPC ......... *G06Q 30/0631* (2013.01); *G06Q 30/06* (2013.01); *G07F 11/002* (2013.01); *G07F 17/005* (2013.01)

(58) Field of Classification Search
CPC .. G07F 17/005; G07F 11/002; G06Q 30/0631
(Continued)

(56) References Cited

U.S. PATENT DOCUMENTS 1,901,243 A 3/1933 Horwitt
2,098,697 A 11/1937 Vanderput
(Continued)

FOREIGN PATENT DOCUMENTS

CA 1236546 A1 5/1988
CA 2302753 A1 5/1999
(Continued)

OTHER PUBLICATIONS

Article 34 Amendment for PCT Application No. PCT/US2010/046872, mailed on Jun. 28, 2011.
(Continued)

*Primary Examiner* — Timothy Waggoner
(74) *Attorney, Agent, or Firm* — James P. Muraff; Neal, Gerber & Eisenberg LLP

(57) ABSTRACT

A method of substituting digital alternative media for a requested media selection to a customer is provided. The method includes receiving a request related to the requested media selection through a user interface from the customer, identifying an associated content provider, and determining the alternative media selection at the associated content provider that corresponds to the requested media selection. The method also includes receiving a unique customer identifier and identifying the associated content provider based on the unique customer identifier. The method further includes mapping the media article to the alternative media selection based on metadata. The requested media selection may be available or may be unavailable due to being out-of-stock or reserved to another customer in an article dispensing machine embodiment. The associated content provider may be linked to the customer based on a subscription. The digital alternative media selection may be accessed by an audio/visual display interface.

20 Claims, 11 Drawing Sheets

Related U.S. Application Data

(60) Provisional application No. 61/497,012, filed on Jun. 14, 2011.

(58) Field of Classification Search
USPC .......................................................... 700/236
See application file for complete search history.

(56) References Cited

U.S. PATENT DOCUMENTS

| | | |
|---|---|---|
| 2,549,624 A | 4/1951 | Moore, Jr. |
| 2,559,599 A | 7/1951 | Crump et al. |
| 2,562,293 A | 7/1951 | Bourquin |
| 3,267,436 A | 8/1966 | Alpert et al. |
| 3,379,295 A | 4/1968 | Varley |
| 3,404,764 A | 10/1968 | Lipp et al. |
| 3,529,155 A | 9/1970 | Hansen |
| 3,622,995 A | 11/1971 | Dilks et al. |
| 3,648,241 A | 3/1972 | Naito et al. |
| 3,824,544 A | 7/1974 | Simjian |
| 3,826,344 A | 7/1974 | Wahlberg |
| 3,831,807 A | 8/1974 | Deaton et al. |
| 3,946,220 A | 3/1976 | Brobeck et al. |
| 3,964,577 A | 6/1976 | Bengtsson |
| 4,043,483 A | 8/1977 | Gore et al. |
| 4,073,368 A | 2/1978 | Mustapick |
| 4,300,040 A | 11/1981 | Gould et al. |
| 4,306,219 A | 12/1981 | Main et al. |
| 4,348,551 A | 9/1982 | Nakatani et al. |
| 4,369,422 A | 1/1983 | Rasmussen et al. |
| 4,369,442 A | 1/1983 | Werth et al. |
| 4,385,366 A | 5/1983 | Housey, Jr. |
| 4,388,689 A | 6/1983 | Hayman et al. |
| 4,396,985 A | 8/1983 | Ohara |
| 4,414,467 A | 11/1983 | Gould et al. |
| 4,415,065 A | 11/1983 | Sandstedt |
| 4,449,186 A | 5/1984 | Kelly et al. |
| 4,458,802 A | 7/1984 | MacIver et al. |
| 4,519,522 A | 5/1985 | McElwee |
| 4,530,067 A | 7/1985 | Dorr |
| 4,547,851 A | 10/1985 | Kurland |
| 4,553,222 A | 11/1985 | Kurland et al. |
| 4,567,359 A | 1/1986 | Lockwood |
| 4,569,421 A | 2/1986 | Sandstedt |
| RE32,115 E | 4/1986 | Lockwood et al. |
| 4,598,810 A | 7/1986 | Shore et al. |
| 4,649,481 A | 3/1987 | Takahashi |
| 4,650,977 A | 3/1987 | Couch |
| 4,668,150 A | 5/1987 | Blumberg |
| 4,669,596 A | 6/1987 | Capers et al. |
| 4,675,515 A | 6/1987 | Lucero |
| 4,706,794 A | 11/1987 | Awane et al. |
| 4,722,053 A | 1/1988 | Dubno et al. |
| 4,723,212 A | 2/1988 | Mindrum et al. |
| 4,734,005 A | 3/1988 | Blumberg |
| 4,766,548 A | 8/1988 | Cedrone et al. |
| 4,767,917 A | 8/1988 | Ushikubo |
| 4,775,935 A | 10/1988 | Yourick |
| 4,778,983 A | 10/1988 | Ushikubo |
| 4,789,045 A | 12/1988 | Pugh |
| 4,789,054 A | 12/1988 | Shore et al. |
| 4,797,818 A | 1/1989 | Cotter |
| 4,812,629 A | 3/1989 | O'Niel et al. |
| 4,812,985 A | 3/1989 | Hambrick et al. |
| 4,814,592 A | 3/1989 | Bradt et al. |
| 4,814,985 A | 3/1989 | Swistak |
| 4,821,629 A | 4/1989 | Davison et al. |
| 4,821,917 A | 4/1989 | Brown |
| 4,825,045 A | 4/1989 | Humble |
| 4,839,505 A | 6/1989 | Bradt et al. |
| 4,839,507 A | 6/1989 | May |
| 4,847,764 A | 7/1989 | Halvorson |
| 4,858,743 A | 8/1989 | Paraskevakos et al. |
| 4,860,876 A | 8/1989 | Moore et al. |
| 4,866,661 A | 9/1989 | De |
| 4,875,598 A | 10/1989 | Dahl |
| 4,882,475 A | 11/1989 | Miller et al. |
| 4,893,705 A | 1/1990 | Brown |
| 4,893,727 A | 1/1990 | Near |
| 4,896,024 A | 1/1990 | Morello et al. |
| 4,903,815 A | 2/1990 | Hirschfeld et al. |
| 4,915,205 A | 4/1990 | Reid et al. |
| D308,052 S | 5/1990 | Darden et al. |
| 4,921,128 A | 5/1990 | Guigan et al. |
| 4,941,841 A | 7/1990 | Darden et al. |
| 4,945,428 A | 7/1990 | Waldo |
| 4,947,028 A | 8/1990 | Gorog |
| 4,959,686 A | 9/1990 | Spallone et al. |
| 4,967,403 A | 10/1990 | Ogawa et al. |
| 4,967,906 A | 11/1990 | Morello et al. |
| 4,982,346 A | 1/1991 | Girouard et al. |
| 4,991,739 A | 2/1991 | Levasseur |
| 4,995,498 A | 2/1991 | Menke |
| 5,007,518 A | 4/1991 | Crooks et al. |
| 5,012,077 A | 4/1991 | Takano |
| 5,013,897 A | 5/1991 | Harman et al. |
| 5,019,699 A | 5/1991 | Koenck |
| 5,020,958 A | 6/1991 | Tuttobene |
| 5,028,766 A | 7/1991 | Shah |
| 5,042,686 A | 8/1991 | Stucki |
| 5,077,462 A | 12/1991 | Newell et al. |
| 5,077,607 A | 12/1991 | Johnson et al. |
| 5,085,308 A | 2/1992 | Wilhelm |
| 5,088,586 A | 2/1992 | Isobe et al. |
| 5,091,713 A | 2/1992 | Horne et al. |
| 5,095,195 A | 3/1992 | Harman et al. |
| 5,105,069 A | 4/1992 | Hakenewerth et al. |
| 5,128,862 A | 7/1992 | Mueller |
| 5,133,441 A | 7/1992 | Brown |
| 5,139,384 A | 8/1992 | Tuttobene |
| 5,143,193 A | 9/1992 | Geraci |
| 5,159,560 A | 10/1992 | Newell et al. |
| 5,205,436 A | 4/1993 | Savage |
| 5,206,814 A | 4/1993 | Cahlander et al. |
| 5,207,784 A | 5/1993 | Schwartzendruber |
| 5,212,649 A | 5/1993 | Pelletier et al. |
| 5,226,519 A | 7/1993 | Dewoolfson |
| 5,235,509 A | 8/1993 | Mueller et al. |
| RE34,369 E | 9/1993 | Darden et al. |
| 5,273,183 A | 12/1993 | Tuttobene |
| 5,313,392 A | 5/1994 | Temma et al. |
| 5,313,393 A | 5/1994 | Varley et al. |
| 5,319,705 A | 6/1994 | Halter et al. |
| 5,323,327 A | 6/1994 | Carmichael et al. |
| 5,353,219 A | 10/1994 | Mueller et al. |
| 5,383,111 A | 1/1995 | Homma et al. |
| 5,385,265 A | 1/1995 | Schlamp |
| 5,402,911 A | 4/1995 | Noelle |
| 5,408,417 A | 4/1995 | Wilder |
| 5,409,092 A | 4/1995 | Itako et al. |
| 5,418,713 A | 5/1995 | Allen |
| 5,442,568 A | 8/1995 | Ostendorf et al. |
| 5,445,295 A | 8/1995 | Brown |
| 5,450,584 A | 9/1995 | Sekiguchi et al. |
| 5,450,938 A | 9/1995 | Rademacher |
| 5,467,892 A | 11/1995 | Schlamp |
| 5,482,139 A | 1/1996 | Rivalto |
| 5,484,988 A | 1/1996 | Hills et al. |
| 5,499,707 A | 3/1996 | Steury |
| 5,504,675 A | 4/1996 | Cragun et al. |
| 5,510,979 A | 4/1996 | Moderi et al. |
| 5,513,116 A | 4/1996 | Buckley et al. |
| 5,546,316 A | 8/1996 | Buckley et al. |
| 5,550,746 A | 8/1996 | Jacobs |
| 5,555,143 A | 9/1996 | Hinnen et al. |
| 5,559,714 A | 9/1996 | Banks et al. |
| 5,559,887 A | 9/1996 | Davis et al. |
| 5,561,604 A | 10/1996 | Buckley et al. |
| 5,576,951 A | 11/1996 | Lockwood |
| 5,594,791 A | 1/1997 | Szlam et al. |
| 5,608,643 A | 3/1997 | Wichter et al. |
| 5,615,123 A | 3/1997 | Davidson et al. |
| 5,632,681 A | 5/1997 | Bakoglu et al. |
| 5,633,839 A | 5/1997 | Alexander et al. |
| 5,637,845 A | 6/1997 | Kolls |

(56) References Cited

U.S. PATENT DOCUMENTS

| | | |
|---|---|---|
| 5,638,985 A | 6/1997 | Fitzgerald et al. |
| 5,644,727 A | 7/1997 | Atkins |
| 5,647,505 A | 7/1997 | Scott |
| 5,647,507 A | 7/1997 | Kasper |
| 5,682,276 A | 10/1997 | Hinnen et al. |
| 5,694,546 A | 12/1997 | Reisman |
| 5,699,262 A | 12/1997 | Lang et al. |
| 5,699,528 A | 12/1997 | Hogan |
| 5,715,403 A | 2/1998 | Stefik et al. |
| 5,724,069 A | 3/1998 | Chen |
| 5,724,521 A | 3/1998 | Dedrick |
| 5,732,398 A | 3/1998 | Tagawa |
| 5,734,150 A | 3/1998 | Brown et al. |
| 5,748,485 A | 5/1998 | Christiansen et al. |
| 5,754,850 A | 5/1998 | Janssen |
| 5,761,071 A | 6/1998 | Bernstein et al. |
| 5,765,142 A | 6/1998 | Allred et al. |
| 5,768,142 A | 6/1998 | Jacobs |
| 5,769,269 A | 6/1998 | Peters |
| 5,777,884 A | 7/1998 | Belka et al. |
| H1743 H | 8/1998 | Graves et al. |
| 5,790,677 A | 8/1998 | Fox et al. |
| 5,806,071 A | 9/1998 | Balderrama et al. |
| 5,822,216 A | 10/1998 | Satchell, Jr. et al. |
| 5,822,291 A | 10/1998 | Brindze et al. |
| 5,831,862 A | 11/1998 | Hetrick et al. |
| 5,832,503 A | 11/1998 | Malik et al. |
| 5,850,442 A | 12/1998 | Muftic |
| 5,870,716 A | 2/1999 | Sugiyama et al. |
| 5,873,069 A | 2/1999 | Reuhl et al. |
| 5,875,110 A | 2/1999 | Jacobs |
| 5,884,278 A | 3/1999 | Powell |
| 5,898,594 A | 4/1999 | Leason et al. |
| 5,900,608 A | 5/1999 | Iida |
| 5,905,246 A | 5/1999 | Fajkowski |
| 5,923,016 A | 7/1999 | Fredregill et al. |
| 5,930,771 A | 7/1999 | Stapp |
| 5,934,439 A | 8/1999 | Kanoh et al. |
| 5,936,452 A | 8/1999 | Utsuno et al. |
| 5,938,510 A | 8/1999 | Takahashi et al. |
| 5,941,363 A | 8/1999 | Partyka et al. |
| 5,943,423 A | 8/1999 | Muftic |
| 5,950,173 A | 9/1999 | Perkowski |
| 5,954,797 A | 9/1999 | Sidey |
| 5,956,694 A | 9/1999 | Powell |
| 5,959,869 A | 9/1999 | Miller et al. |
| 5,963,134 A | 10/1999 | Bowers et al. |
| 5,963,452 A | 10/1999 | Etoh et al. |
| 5,984,509 A | 11/1999 | Scott |
| 5,988,346 A | 11/1999 | Tedesco et al. |
| 5,988,431 A | 11/1999 | Roe |
| 5,997,170 A | 12/1999 | Brodbeck |
| 6,002,395 A | 12/1999 | Wagner et al. |
| 6,010,239 A | 1/2000 | Hardgrave et al. |
| 6,014,137 A | 1/2000 | Burns |
| 6,029,851 A | 2/2000 | Jenkins et al. |
| 6,039,244 A | 3/2000 | Finsterwald |
| 6,044,362 A | 3/2000 | Neely |
| 6,047,338 A | 4/2000 | Grolemund |
| 6,050,448 A | 4/2000 | Willis |
| 6,056,150 A | 5/2000 | Kasper |
| 6,056,194 A | 5/2000 | Kolls |
| 6,058,373 A | 5/2000 | Blinn et al. |
| 6,061,660 A | 5/2000 | Eggleston et al. |
| 6,062,478 A | 5/2000 | Izaguirre et al. |
| 6,072,481 A | 6/2000 | Matsushita et al. |
| 6,076,101 A | 6/2000 | Kamakura et al. |
| 6,078,848 A | 6/2000 | Bernstein et al. |
| 6,085,888 A | 7/2000 | Tedesco et al. |
| 6,101,483 A | 8/2000 | Petrovich et al. |
| 6,109,524 A | 8/2000 | Kanoh et al. |
| 6,115,649 A | 9/2000 | Sakata |
| 6,119,934 A | 9/2000 | Kolls |
| 6,123,223 A | 9/2000 | Watkins |
| 6,125,353 A | 9/2000 | Yagasaki |
| 6,126,036 A | 10/2000 | d'Alayer de Costemore d'arc et al. |
| 6,134,547 A | 10/2000 | Huxley et al. |
| 6,138,911 A | 10/2000 | Fredregill et al. |
| 6,161,059 A | 12/2000 | Tedesco et al. |
| 6,164,528 A | 12/2000 | Hills et al. |
| 6,169,483 B1 | 1/2001 | Ghaffari et al. |
| 6,179,206 B1 | 1/2001 | Matsumori |
| 6,181,981 B1 | 1/2001 | Varga et al. |
| 6,182,857 B1 | 2/2001 | Hamm et al. |
| 6,195,661 B1 | 2/2001 | Filepp et al. |
| 6,199,141 B1 | 3/2001 | Weinreb et al. |
| 6,199,720 B1 | 3/2001 | Rudick et al. |
| 6,201,474 B1 | 3/2001 | Brady et al. |
| 6,202,006 B1 | 3/2001 | Scott |
| 6,209,322 B1 | 4/2001 | Yoshida et al. |
| 6,243,687 B1 | 6/2001 | Powell |
| 6,250,452 B1 | 6/2001 | Partyka et al. |
| 6,264,104 B1 | 7/2001 | Jenkins et al. |
| 6,269,285 B1 | 7/2001 | Mignault |
| 6,286,139 B1 | 9/2001 | Decinque |
| 6,289,322 B1 | 9/2001 | Kitchen et al. |
| 6,295,482 B1 | 9/2001 | Tognazzini |
| 6,298,972 B1 | 10/2001 | Tedesco et al. |
| 6,311,165 B1 | 10/2001 | Coutts et al. |
| 6,317,649 B1 | 11/2001 | Tedesco et al. |
| 6,321,985 B1 | 11/2001 | Kolls |
| 6,324,520 B1 | 11/2001 | Walker et al. |
| 6,327,230 B1 | 12/2001 | Miller et al. |
| 6,330,958 B1 | 12/2001 | Ruskin et al. |
| 6,334,110 B1 | 12/2001 | Walter et al. |
| 6,336,098 B1 | 1/2002 | Fortenberry et al. |
| 6,354,501 B1 | 3/2002 | Outwater et al. |
| 6,360,139 B1 | 3/2002 | Jacobs |
| 6,366,914 B1 | 4/2002 | Stern |
| 6,367,653 B1 | 4/2002 | Ruskin et al. |
| 6,367,696 B1 | 4/2002 | Inamitsu et al. |
| 6,397,126 B1 | 5/2002 | Nelson |
| 6,397,199 B1 | 5/2002 | Goodwin, III |
| 6,412,654 B1 | 7/2002 | Cleeve |
| 6,415,555 B1 | 7/2002 | Montague |
| 6,415,950 B1 | 7/2002 | Robrechts |
| 6,416,270 B1 | 7/2002 | Steury et al. |
| 6,424,706 B1 | 7/2002 | Katz et al. |
| 6,430,470 B1 | 8/2002 | Nakajima et al. |
| 6,435,406 B1 | 8/2002 | Pentel |
| 6,438,447 B1 | 8/2002 | Belka et al. |
| 6,456,981 B1 | 9/2002 | Dejaeger et al. |
| 6,457,038 B1 | 9/2002 | Defosse |
| 6,462,644 B1 | 10/2002 | Howell et al. |
| 6,466,658 B2 | 10/2002 | Schelberg, Jr. et al. |
| 6,466,830 B1 | 10/2002 | Manross et al. |
| 6,477,503 B1 | 11/2002 | Mankes |
| 6,490,502 B2 | 12/2002 | Fellows et al. |
| 6,493,110 B1 | 12/2002 | Roberts |
| 6,505,095 B1 | 1/2003 | Kolls |
| 6,522,772 B1 | 2/2003 | Morrison et al. |
| 6,527,176 B2 | 3/2003 | Baric |
| 6,539,282 B2 | 3/2003 | Metcalf et al. |
| 6,540,100 B2 | 4/2003 | Credle, Jr. et al. |
| 6,575,363 B1 | 6/2003 | Leason et al. |
| 6,584,309 B1 | 6/2003 | Whigham |
| 6,584,450 B1 | 6/2003 | Hastings et al. |
| 6,584,564 B2 | 6/2003 | Olkin et al. |
| 6,587,748 B2 | 7/2003 | Baack |
| 6,587,835 B1 | 7/2003 | Treyz et al. |
| 6,595,342 B1 | 7/2003 | Maritzen et al. |
| 6,606,602 B1 | 8/2003 | Kolls |
| 6,628,764 B1 | 9/2003 | Petite |
| 6,640,159 B2 | 10/2003 | Holmes et al. |
| 6,644,455 B2 | 11/2003 | Ichikawa |
| 6,644,495 B2 | 11/2003 | Ruskin et al. |
| 6,655,580 B1 | 12/2003 | Ergo et al. |
| 6,658,323 B2 | 12/2003 | Tedesco et al. |
| 6,675,067 B2 | 1/2004 | Blad |
| 6,688,523 B1 | 2/2004 | Koenck |
| 6,696,918 B2 | 2/2004 | Kucharczyk et al. |
| 6,707,380 B2 | 3/2004 | Maloney |
| 6,707,381 B1 | 3/2004 | Maloney |

(56) References Cited

U.S. PATENT DOCUMENTS

| | | |
|---|---|---|
| 6,708,879 B2 | 3/2004 | Hunt |
| 6,711,464 B1 | 3/2004 | Yap et al. |
| 6,711,465 B2 | 3/2004 | Tomassi |
| 6,715,403 B2 | 4/2004 | Hajek, Jr. et al. |
| 6,728,532 B1 | 4/2004 | Ahonen |
| 6,742,673 B2 | 6/2004 | Credle, Jr. et al. |
| 6,748,296 B2 | 6/2004 | Banerjee et al. |
| 6,748,539 B1 | 6/2004 | Lotspiech |
| 6,754,559 B2 | 6/2004 | Itako |
| 6,757,585 B2 | 6/2004 | Ohtsuki et al. |
| 6,792,334 B2 | 9/2004 | Metcalf et al. |
| 6,794,634 B2 | 9/2004 | Hair, III et al. |
| 6,814,256 B2 | 11/2004 | Clark |
| 6,847,861 B2 | 1/2005 | Lunak et al. |
| 6,850,816 B2 | 2/2005 | Garratt |
| 6,851,092 B2 | 2/2005 | Chang et al. |
| 6,854,642 B2 | 2/2005 | Metcalf et al. |
| 6,923,371 B2 | 8/2005 | Goodfellow |
| 6,932,270 B1 | 8/2005 | Fajkowski |
| 6,954,732 B1 | 10/2005 | Delapa et al. |
| 6,959,285 B2 | 10/2005 | Stefanik et al. |
| 6,959,286 B2 | 10/2005 | Perkowski |
| 6,965,869 B1 | 11/2005 | Tomita et al. |
| 6,968,365 B2 | 11/2005 | Hollstrom et al. |
| 6,970,837 B1 | 11/2005 | Walker et al. |
| 6,980,887 B2 | 12/2005 | Varga et al. |
| 6,985,607 B2 | 1/2006 | Alasia et al. |
| 7,024,381 B1 | 4/2006 | Hastings et al. |
| 7,024,390 B1 | 4/2006 | Mori et al. |
| 7,043,497 B1 | 5/2006 | Carty et al. |
| 7,053,773 B2 | 5/2006 | McGarry et al. |
| 7,058,581 B1 | 6/2006 | Young |
| 7,076,328 B2 | 7/2006 | Piikivi |
| 7,076,329 B1 | 7/2006 | Kolls |
| 7,079,230 B1 | 7/2006 | McInerney et al. |
| 7,079,822 B2 | 7/2006 | Gunji et al. |
| 7,079,922 B2 | 7/2006 | Komai |
| 7,085,556 B2 | 8/2006 | Offer |
| 7,085,727 B2 | 8/2006 | Vanorman |
| 7,101,139 B1 | 9/2006 | Benedict |
| 7,108,180 B2 | 9/2006 | Brusso et al. |
| 7,139,731 B1 | 11/2006 | Alvin |
| 7,167,842 B1 | 1/2007 | Josephson, II et al. |
| 7,167,892 B2 | 1/2007 | Defosse et al. |
| 7,174,317 B2 | 2/2007 | Phillips et al. |
| 7,191,952 B2 | 3/2007 | Blossom |
| 7,203,675 B1 | 4/2007 | Papierniak et al. |
| 7,209,893 B2 | 4/2007 | Nii |
| 7,213,753 B2 | 5/2007 | Barton et al. |
| 7,233,916 B2 | 6/2007 | Schultz |
| 7,234,609 B2 | 6/2007 | Delazzer et al. |
| 7,236,942 B1 | 6/2007 | Walker et al. |
| 7,236,946 B2 | 6/2007 | Bates et al. |
| 7,240,805 B2 | 7/2007 | Chirnomas |
| 7,240,843 B2 | 7/2007 | Paul et al. |
| 7,310,612 B2 | 12/2007 | McQueen, III et al. |
| 7,315,629 B2 | 1/2008 | Alasia et al. |
| 7,347,359 B2 | 3/2008 | Boyes et al. |
| 7,350,230 B2 | 3/2008 | Forrest |
| 7,366,586 B2 | 4/2008 | Kaplan et al. |
| 7,389,243 B2 | 6/2008 | Gross |
| 7,406,693 B1 | 7/2008 | Goodwin, III |
| 7,412,073 B2 | 8/2008 | Alasia et al. |
| 7,444,296 B1 | 10/2008 | Barber et al. |
| 7,447,605 B2 | 11/2008 | Kuehnrich |
| 7,499,768 B2 | 3/2009 | Hoersten et al. |
| 7,584,869 B2 | 9/2009 | Delazzer et al. |
| 7,747,346 B2 | 6/2010 | Lowe et al. |
| RE41,543 E | 8/2010 | Satchell, Jr. et al. |
| 7,774,233 B2 | 8/2010 | Barber et al. |
| 7,787,987 B2 | 8/2010 | Kuehnrich et al. |
| 7,797,077 B2 | 9/2010 | Hale |
| 7,797,164 B2 | 9/2010 | Junger et al. |
| 7,853,354 B2 | 12/2010 | Kuehnrich et al. |
| 7,853,600 B2 | 12/2010 | Herz et al. |
| 7,860,606 B2 | 12/2010 | Rudy |
| 7,925,973 B2 | 4/2011 | Allaire et al. |
| 7,988,049 B2 | 8/2011 | Kuehnrich |
| 8,036,774 B2 | 10/2011 | Blust et al. |
| 8,041,454 B2 | 10/2011 | Blust et al. |
| 8,060,247 B2 | 11/2011 | Kaplan et al. |
| 8,060,249 B2 | 11/2011 | Bear et al. |
| 8,078,316 B2 | 12/2011 | Blust et al. |
| 8,086,349 B2 | 12/2011 | Blust et al. |
| 8,155,784 B2 | 4/2012 | Lowe et al. |
| 8,234,207 B2 | 7/2012 | Breitenbach et al. |
| 8,235,247 B2 | 8/2012 | Alvarez |
| 8,306,908 B1 | 11/2012 | Barker et al. |
| 8,352,449 B1 | 1/2013 | Parekh et al. |
| 8,386,347 B2 | 2/2013 | Hoblit |
| 8,412,374 B2 | 4/2013 | Kuehnrich et al. |
| 8,417,380 B2 | 4/2013 | Kuehnrich et al. |
| 8,463,432 B2 | 6/2013 | Weinshenker |
| 8,510,171 B2 | 8/2013 | Pederson et al. |
| 8,538,581 B2 | 9/2013 | Kuehnrich et al. |
| 8,718,439 B2 * | 5/2014 | Rosengart ............... H04N 5/44 386/219 |
| 8,752,093 B2 | 6/2014 | White et al. |
| 8,996,162 B2 | 3/2015 | Lowe et al. |
| 9,280,787 B2 * | 3/2016 | Maskatia ............... G06Q 30/06 |
| 2001/0011252 A1 | 8/2001 | Kasahara |
| 2001/0011680 A1 | 8/2001 | Soltesz et al. |
| 2001/0027357 A1 | 10/2001 | Grobler |
| 2001/0035425 A1 | 11/2001 | Rocco et al. |
| 2001/0037207 A1 | 11/2001 | Dejaeger |
| 2001/0047223 A1 | 11/2001 | Metcalf et al. |
| 2002/0029196 A1 | 3/2002 | Metcalf et al. |
| 2002/0046122 A1 | 4/2002 | Barber et al. |
| 2002/0046123 A1 | 4/2002 | Nicolini |
| 2002/0065579 A1 | 5/2002 | Tedesco et al. |
| 2002/0074397 A1 | 6/2002 | Matthews |
| 2002/0082917 A1 | 6/2002 | Takano |
| 2002/0084322 A1 | 7/2002 | Baric |
| 2002/0087334 A1 | 7/2002 | Yamaguchi et al. |
| 2002/0095680 A1 | 7/2002 | Davidson |
| 2002/0125314 A1 | 9/2002 | Jenkins et al. |
| 2002/0133269 A1 | 9/2002 | Anselmi |
| 2002/0161475 A1 | 10/2002 | Varga et al. |
| 2002/0165787 A1 | 11/2002 | Bates et al. |
| 2002/0165788 A1 | 11/2002 | Bates et al. |
| 2002/0165821 A1 | 11/2002 | Tree |
| 2002/0169715 A1 | 11/2002 | Ruth et al. |
| 2002/0183882 A1 | 12/2002 | Dearing et al. |
| 2002/0195491 A1 | 12/2002 | Bunch, III |
| 2003/0004828 A1 | 1/2003 | Epstein |
| 2003/0009408 A1 | 1/2003 | Korin |
| 2003/0023453 A1 | 1/2003 | Hafen et al. |
| 2003/0030539 A1 | 2/2003 | McGarry et al. |
| 2003/0033054 A1 | 2/2003 | Yamazaki |
| 2003/0057219 A1 | 3/2003 | Risolia |
| 2003/0061094 A1 | 3/2003 | Banerjee et al. |
| 2003/0105554 A1 | 6/2003 | Eggenberger et al. |
| 2003/0125961 A1 | 7/2003 | Janda |
| 2003/0130762 A1 | 7/2003 | Tomassi |
| 2003/0149510 A1 | 8/2003 | Takahashi |
| 2003/0154141 A1 | 8/2003 | Capazario et al. |
| 2003/0163382 A1 | 8/2003 | Stefanik et al. |
| 2003/0163399 A1 | 8/2003 | Harper et al. |
| 2003/0167231 A1 | 9/2003 | Winking et al. |
| 2003/0204289 A1 | 10/2003 | Banerjee et al. |
| 2003/0212471 A1 | 11/2003 | Chakravarti |
| 2004/0006537 A1 | 1/2004 | Zelechoski et al. |
| 2004/0010340 A1 | 1/2004 | Guindulain Vidondo |
| 2004/0016620 A1 | 1/2004 | Davis |
| 2004/0030446 A1 | 2/2004 | Guindulain Vidondo |
| 2004/0050648 A1 | 3/2004 | Carapelli |
| 2004/0064347 A1 | 4/2004 | Vanorman |
| 2004/0064377 A1 | 4/2004 | Ergo et al. |
| 2004/0065579 A1 | 4/2004 | Wood |
| 2004/0068346 A1 | 4/2004 | Boucher |
| 2004/0068451 A1 | 4/2004 | Lenk et al. |
| 2004/0078328 A1 | 4/2004 | Talbert et al. |
| 2004/0079798 A1 | 4/2004 | Messenger et al. |
| 2004/0133466 A1 | 7/2004 | Redmond et al. |

(56) References Cited

U.S. PATENT DOCUMENTS

| | | |
|---|---|---|
| 2004/0133653 A1 | 7/2004 | Defosse et al. |
| 2004/0153413 A1 | 8/2004 | Gross |
| 2004/0158503 A1 | 8/2004 | Gross |
| 2004/0158504 A1 | 8/2004 | Gross |
| 2004/0158871 A1 | 8/2004 | Jacobson |
| 2004/0162633 A1 | 8/2004 | Kraft et al. |
| 2004/0162783 A1 | 8/2004 | Gross |
| 2004/0172274 A1 | 9/2004 | Gross |
| 2004/0172275 A1 | 9/2004 | Gross |
| 2004/0172342 A1 | 9/2004 | Gross |
| 2004/0186783 A1 | 9/2004 | Knight et al. |
| 2004/0243479 A1 | 12/2004 | Gross |
| 2004/0243480 A1 | 12/2004 | Gross |
| 2004/0249711 A1 | 12/2004 | Walker et al. |
| 2004/0254676 A1 | 12/2004 | Blust et al. |
| 2004/0256402 A1 | 12/2004 | Chirnomas |
| 2004/0260600 A1 | 12/2004 | Gross |
| 2004/0267604 A1 | 12/2004 | Gross |
| 2004/0267640 A1 | 12/2004 | Bong et al. |
| 2005/0022239 A1 | 1/2005 | Meuleman |
| 2005/0027648 A1 | 2/2005 | Knowles et al. |
| 2005/0033855 A1 | 2/2005 | Moradi et al. |
| 2005/0060062 A1 | 3/2005 | Walker et al. |
| 2005/0060246 A1 | 3/2005 | Lastinger et al. |
| 2005/0080510 A1 | 4/2005 | Bates et al. |
| 2005/0085946 A1 | 4/2005 | Visikivi et al. |
| 2005/0086127 A1 | 4/2005 | Hastings et al. |
| 2005/0091069 A1 | 4/2005 | Chuang |
| 2005/0096936 A1 | 5/2005 | Lambers |
| 2005/0109836 A1 | 5/2005 | Ben-Aissa |
| 2005/0177494 A1 | 8/2005 | Kelly et al. |
| 2005/0197855 A1 | 9/2005 | Nudd et al. |
| 2005/0216120 A1 | 9/2005 | Rosenberg et al. |
| 2005/0230410 A1 | 10/2005 | Delazzer et al. |
| 2005/0230473 A1 | 10/2005 | Fajkowski |
| 2005/0234911 A1 | 10/2005 | Hess et al. |
| 2005/0261977 A1 | 11/2005 | Kiji et al. |
| 2005/0267819 A1 | 12/2005 | Kaplan |
| 2005/0274793 A1 | 12/2005 | Cantini et al. |
| 2005/0283434 A1 | 12/2005 | Hahn-Carlson et al. |
| 2005/0289032 A1 | 12/2005 | Hoblit |
| 2006/0026031 A1 | 2/2006 | Gentling |
| 2006/0026162 A1 | 2/2006 | Salmonsen |
| 2006/0041508 A1 | 2/2006 | Pham et al. |
| 2006/0045660 A1 | 3/2006 | Di |
| 2006/0074777 A1 | 4/2006 | Anderson |
| 2006/0095286 A1 | 5/2006 | Kimura |
| 2006/0095339 A1 | 5/2006 | Hayashi et al. |
| 2006/0096997 A1 | 5/2006 | Yeo |
| 2006/0122881 A1 | 6/2006 | Walker et al. |
| 2006/0149685 A1 | 7/2006 | Gross |
| 2006/0155575 A1 | 7/2006 | Gross |
| 2006/0184395 A1 | 8/2006 | Millwee |
| 2006/0190345 A1 | 8/2006 | Crowley |
| 2006/0212360 A1 | 9/2006 | Stefanik et al. |
| 2006/0212367 A1 | 9/2006 | Gross |
| 2006/0231612 A1 | 10/2006 | Walker et al. |
| 2006/0231613 A1 | 10/2006 | Walker et al. |
| 2006/0231614 A1 | 10/2006 | Walker et al. |
| 2006/0235746 A1 | 10/2006 | Hammond et al. |
| 2006/0235747 A1 | 10/2006 | Hammond et al. |
| 2006/0241966 A1 | 10/2006 | Walker et al. |
| 2006/0241967 A1 | 10/2006 | Gross |
| 2006/0242059 A1 | 10/2006 | Hansen |
| 2006/0247823 A1 | 11/2006 | Boucher |
| 2006/0247824 A1 | 11/2006 | Walker et al. |
| 2006/0254832 A1 | 11/2006 | Strong |
| 2006/0254862 A1 | 11/2006 | Hoersten |
| 2006/0259191 A1 | 11/2006 | Lowe |
| 2006/0260875 A1 | 11/2006 | Hoersten |
| 2006/0265286 A1 | 11/2006 | Evangelist et al. |
| 2006/0266823 A1 | 11/2006 | Passen et al. |
| 2006/0273152 A1 | 12/2006 | Fields |
| 2007/0005438 A1 | 1/2007 | Evangelist et al. |
| 2007/0011093 A1 | 1/2007 | Tree |
| 2007/0011903 A1 | 1/2007 | Chang |
| 2007/0050083 A1 | 3/2007 | Signorelli et al. |
| 2007/0050256 A1 | 3/2007 | Walker et al. |
| 2007/0050266 A1 | 3/2007 | Barber et al. |
| 2007/0051802 A1 | 3/2007 | Barber et al. |
| 2007/0063020 A1 | 3/2007 | Barrafato |
| 2007/0063027 A1 | 3/2007 | Belfer et al. |
| 2007/0067429 A1 | 3/2007 | Jain et al. |
| 2007/0084872 A1 | 4/2007 | Hair, III et al. |
| 2007/0084917 A1 | 4/2007 | Fajkowski |
| 2007/0094245 A1 | 4/2007 | Vigil |
| 2007/0095901 A1 | 5/2007 | Illingworth |
| 2007/0125104 A1 | 6/2007 | Ehlers |
| 2007/0130020 A1 | 6/2007 | Paolini |
| 2007/0136247 A1 | 6/2007 | Vigil |
| 2007/0156442 A1 | 7/2007 | Ali |
| 2007/0156578 A1 | 7/2007 | Perazolo |
| 2007/0162183 A1 | 7/2007 | Pinney et al. |
| 2007/0162184 A1 | 7/2007 | Pinney et al. |
| 2007/0169132 A1 | 7/2007 | Blust et al. |
| 2007/0175986 A1 | 8/2007 | Petrone et al. |
| 2007/0179668 A1 | 8/2007 | Mellin |
| 2007/0185776 A1 | 8/2007 | Nguyen et al. |
| 2007/0210153 A1 | 9/2007 | Walker et al. |
| 2007/0213871 A1 | 9/2007 | Whitten et al. |
| 2007/0252003 A1 | 11/2007 | Goldring et al. |
| 2007/0276537 A1 | 11/2007 | Walker et al. |
| 2007/0299737 A1 | 12/2007 | Plastina et al. |
| 2008/0005025 A1 | 1/2008 | Legere et al. |
| 2008/0027835 A1 | 1/2008 | Lemasters et al. |
| 2008/0040211 A1 | 2/2008 | Walker et al. |
| 2008/0097770 A1 | 4/2008 | Low et al. |
| 2008/0116262 A1 | 5/2008 | Majer |
| 2008/0125906 A1 | 5/2008 | Bates et al. |
| 2008/0131255 A1 | 6/2008 | Hessler et al. |
| 2008/0222690 A1 | 9/2008 | Kim |
| 2008/0239961 A1 | 10/2008 | Hilerio et al. |
| 2008/0249658 A1 | 10/2008 | Walker et al. |
| 2008/0275591 A1 | 11/2008 | Chirnomas et al. |
| 2008/0313973 A1 | 12/2008 | Butler |
| 2009/0030931 A1 | 1/2009 | Khivesara et al. |
| 2009/0048932 A1 | 2/2009 | Barber |
| 2009/0089187 A1 | 4/2009 | Hoersten et al. |
| 2009/0113116 A1 | 4/2009 | Thompson et al. |
| 2009/0139886 A1 | 6/2009 | Blust et al. |
| 2009/0299824 A1 | 12/2009 | Barnes, Jr. |
| 2009/0326708 A1 | 12/2009 | Rudy et al. |
| 2010/0010964 A1 | 1/2010 | Skowronek et al. |
| 2010/0036808 A1 | 2/2010 | Lee |
| 2010/0042577 A1 | 2/2010 | Rinearson |
| 2010/0057871 A1* | 3/2010 | Kaplan ............ G07F 9/026 700/231 |
| 2010/0127013 A1 | 5/2010 | Butler |
| 2010/0138037 A1 | 6/2010 | Adelberg et al. |
| 2010/0153983 A1 | 6/2010 | Philmon et al. |
| 2010/0198400 A1 | 8/2010 | Pascal et al. |
| 2010/0211217 A1* | 8/2010 | Hirsh ............ G06Q 20/123 700/234 |
| 2010/0274624 A1 | 10/2010 | Rochford et al. |
| 2010/0296908 A1 | 11/2010 | Ko |
| 2010/0312380 A1 | 12/2010 | Lowe et al. |
| 2010/0314405 A1 | 12/2010 | Alvarez |
| 2010/0316468 A1 | 12/2010 | Lert et al. |
| 2011/0004536 A1 | 1/2011 | Hoersten et al. |
| 2011/0047010 A1 | 2/2011 | Arnold et al. |
| 2011/0060454 A1 | 3/2011 | Lowe et al. |
| 2011/0060456 A1 | 3/2011 | Lowe et al. |
| 2011/0093329 A1 | 4/2011 | Bodor et al. |
| 2011/0103609 A1 | 5/2011 | Pelland et al. |
| 2011/0130873 A1 | 6/2011 | Yepez et al. |
| 2011/0131652 A1 | 6/2011 | Robinson et al. |
| 2011/0153060 A1 | 6/2011 | Yepez et al. |
| 2011/0153067 A1 | 6/2011 | Weinshenker |
| 2011/0153071 A1 | 6/2011 | Claessen |
| 2011/0238194 A1 | 9/2011 | Rosenberg |
| 2011/0238296 A1 | 9/2011 | Purks et al. |
| 2012/0046786 A1 | 2/2012 | Kuehnrich et al. |
| 2012/0059511 A1 | 3/2012 | Majer |
| 2012/0123587 A1 | 5/2012 | Mockus et al. |

(56) References Cited

U.S. PATENT DOCUMENTS

| | | |
|---|---|---|
| 2012/0290423 A1 | 11/2012 | Hoersten |
| 2012/0310409 A1 | 12/2012 | Breitenbach et al. |
| 2012/0311633 A1 | 12/2012 | Mandrekar et al. |
| 2012/0330458 A1 | 12/2012 | Weiss |
| 2013/0046707 A1 | 2/2013 | Maskatia et al. |
| 2013/0060648 A1 | 3/2013 | Maskatia et al. |
| 2013/0066464 A1 | 3/2013 | Maskatia et al. |
| 2013/0073468 A1 | 3/2013 | Maskatia et al. |
| 2013/0131863 A1 | 5/2013 | Hoersten et al. |
| 2013/0231776 A1 | 9/2013 | Kuehnrich et al. |
| 2013/0238115 A1 | 9/2013 | Smith et al. |
| 2013/0310970 A1 | 11/2013 | Segal et al. |
| 2014/0052292 A1 | 2/2014 | Lowe |
| 2014/0081450 A1 | 3/2014 | Kuehnrich et al. |

FOREIGN PATENT DOCUMENTS

| | | |
|---|---|---|
| CA | 2605543 A1 | 11/2006 |
| CA | 2605550 A1 | 11/2006 |
| CA | 2605552 A1 | 11/2006 |
| CA | 2605563 A1 | 11/2006 |
| CA | 2605567 A1 | 11/2006 |
| CA | 2606388 A1 | 11/2006 |
| CA | 2606391 A1 | 11/2006 |
| CA | 2604730 A1 | 3/2009 |
| CA | 2566324 C | 6/2013 |
| CA | 2606385 C | 4/2015 |
| DE | 3529155 A1 | 2/1987 |
| EP | 0060643 A2 | 9/1982 |
| EP | 0205691 A1 | 12/1986 |
| EP | 0247876 A2 | 12/1987 |
| EP | 0249367 A2 | 12/1987 |
| EP | 0287367 A1 | 10/1988 |
| EP | 0572119 A2 | 12/1993 |
| EP | 0986033 A2 | 3/2000 |
| EP | 1367549 A1 | 12/2003 |
| EP | 1771783 A1 | 4/2007 |
| EP | 2113892 A1 | 11/2009 |
| EP | 1396824 B1 | 7/2010 |
| EP | 2249367 A1 | 11/2010 |
| EP | 2363798 A1 | 9/2011 |
| FR | 2549624 A1 | 1/1985 |
| FR | 2559599 A1 | 8/1985 |
| FR | 2562293 A1 | 10/1985 |
| GB | 380926 A | 9/1932 |
| GB | 2143662 A | 2/1985 |
| GB | 2172720 A | 9/1986 |
| GB | 2402242 A | 12/2004 |
| JP | S55156107 A | 12/1980 |
| JP | S5647855 A | 4/1981 |
| JP | H02178795 A | 7/1990 |
| JP | H0362189 A | 3/1991 |
| JP | H03119496 A | 5/1991 |
| JP | H10247982 A | 9/1998 |
| JP | 2000149136 A | 5/2000 |
| JP | 2003036328 A | 2/2003 |
| JP | 2004094857 A | 3/2004 |
| JP | 2009043143 A | 2/2009 |
| KR | 1019990066053 A | 8/1999 |
| KR | 20030089154 A | 11/2003 |
| KR | 20040069053 A | 8/2004 |
| KR | 20060080175 A | 7/2006 |
| KR | 20060114658 A | 11/2006 |
| KR | 20070021301 A | 2/2007 |
| WO | 8700948 A1 | 2/1987 |
| WO | 8705425 A1 | 9/1987 |
| WO | 8804085 A1 | 6/1988 |
| WO | 8806771 A1 | 9/1988 |
| WO | 9300644 A1 | 1/1993 |
| WO | 9404446 A1 | 3/1994 |
| WO | 9618972 A1 | 6/1996 |
| WO | 9847799 A1 | 10/1998 |
| WO | 9924902 A1 | 5/1999 |
| WO | 0038120 A1 | 6/2000 |
| WO | 0072160 A1 | 11/2000 |
| WO | 0225552 A2 | 3/2002 |
| WO | 0229708 A1 | 4/2002 |
| WO | 2004070646 A2 | 8/2004 |
| WO | 2005062887 A2 | 7/2005 |
| WO | 2006112817 A1 | 10/2006 |
| WO | 2006116108 A2 | 11/2006 |
| WO | 2006116109 A2 | 11/2006 |
| WO | 2006116110 A2 | 11/2006 |
| WO | 2006116112 A1 | 11/2006 |
| WO | 2006116113 A2 | 11/2006 |
| WO | 2006116114 A2 | 11/2006 |
| WO | 2006116115 A2 | 11/2006 |
| WO | 2006116116 A2 | 11/2006 |
| WO | 2006130638 A2 | 12/2006 |
| WO | 2007012816 A1 | 2/2007 |
| WO | 2009032946 A1 | 3/2009 |
| WO | 2010048375 A1 | 4/2010 |
| WO | 2011022689 A2 | 2/2011 |
| WO | 2011028727 A2 | 3/2011 |
| WO | 2011028728 A2 | 3/2011 |
| WO | 2011031532 A2 | 3/2011 |
| WO | 2012027297 A2 | 3/2012 |
| WO | 2012031209 A2 | 3/2012 |
| WO | 2012112457 A2 | 8/2012 |
| WO | 2012174171 A2 | 12/2012 |
| WO | 2012174172 A2 | 12/2012 |

OTHER PUBLICATIONS

European Search Report for Application No. EP11004042, mailed on Jul. 28, 2011, 2 pages.
"European Search Report for Application No. EP1280399, mailed on Aug. 19, 2015, 8 pages."
Examination Report for EP 05736275.8, mailed on May 15, 2009.
"Examination Report for EP 10814374.4, mailed on Oct. 8, 2015".
"Examination Report for EP 10814375.1, mailed on Sep. 29, 2015".
International Preliminary Report on Patentability for Application No. PCT/US2005/12563, mailed on Apr. 7, 2006, 3 pages.
International Preliminary Report on Patentability for Application No. PCT/US2006/15125, mailed on Jan. 11, 2007, 4 pages.
International Preliminary Report on Patentability for Application No. PCT/US2006/15126, mailed on Apr. 3, 2008, 6 pages.
International Preliminary Report on Patentability for Application No. PCT/US2006/15127, mailed on Jun. 19, 2008, 4 pages.
International Preliminary Report on Patentability for Application No. PCT/US2006/15129, mailed on Sep. 20, 2006, 4 pages.
International Preliminary Report on Patentability for Application No. PCT/US2006/15130, mailed on Apr. 23, 2007, 56 pages.
International Preliminary Report on Patentability for Application No. PCT/US2006/15131, mailed on Jul. 7, 2008, 4 pages.
International Preliminary Report on Patentability for Application No. PCT/US2006/15132, mailed on Nov. 16, 2007, 4 pages.
International Preliminary Report on Patentability for Application No. PCT/US2006/15133, mailed on Jun. 6, 2007, 4 pages.
International Preliminary Report on Patentability for Application No. PCT/US2010/046219, mailed on Feb. 28, 2011, 6 pages.
International Preliminary Report on Patentability for Application No. PCT/US2010/046872, mailed on Sep. 7, 2011, 14 pages.
International Preliminary Report on Patentability for Application No. PCT/US2010/047371, mailed on Apr. 29, 2011, 7 pages.
International Preliminary Report on Patentability for Application No. PCT/US2010/047374, mailed on May 2, 2011, 7 pages.
International Preliminary Report on Patentability for Application No. PCT/US2010/050339, mailed on Apr. 12, 2012, 9 pages.
International Preliminary Report on Patentability for Application No. PCT/US2011/48686, mailed on Mar. 7, 2013, 6 pages.
International Preliminary Report on Patentability for Application No. PCT/US2012/024900, mailed on Aug. 29, 2013, 6 pages.
International Search Report and Written Opinion for Application No. PCT/US2005/012563, mailed on Aug. 10, 2005, 4 pages.
International Search Report and Written Opinion for Application No. PCT/US2006/015125, mailed on Jan. 11, 2007, 4 pages.
International Search Report and Written Opinion for Application No. PCT/US2006/015126, mailed on Apr. 3, 2008, 6 pages.

(56) References Cited

OTHER PUBLICATIONS

International Search Report and Written Opinion for Application No. PCT/US2006/015127, mailed on Jun. 19, 2008, 4 pages.
International Search Report and Written Opinion for Application No. PCT/US2006/015129, mailed on Sep. 20, 2006, 4 pages.
International Search Report and Written Opinion for Application No. PCT/US2006/015130, mailed on Nov. 22, 2006, 4 pages.
International Search Report and Written Opinion for Application No. PCT/US2006/015131, mailed on Jul. 7, 2008, 4 pages.
International Search Report and Written Opinion for Application No. PCT/US2006/015132, mailed on May 10, 2007, 4 pages.
International Search Report and Written Opinion for Application No. PCT/US2006/015133, mailed on Jun. 6, 2007, 4 pages.
International Search Report and Written Opinion for Application No. PCT/US2010/046219, mailed on Feb. 28, 2011, 10 pages.
International Search Report and Written Opinion for Application No. PCT/US2010/046872, mailed on Mar. 29, 2011, 7 pages.
International Search Report and Written Opinion for Application No. PCT/US2010/047371, mailed on Apr. 29, 2011, 9 pages.
International Search Report and Written Opinion for Application No. PCT/US2010/047374, mailed on May 2, 2011, 9 pages.
International Search Report and Written Opinion for Application No. PCT/US2011/048686, mailed on Apr. 9, 2012, 9 pages.
International Search Report and Written Opinion for Application No. PCT/US2011/050339, mailed on Feb. 29, 2012, 8 pages.
International Search Report and Written Opinion for Application No. PCT/US2012/024900, mailed on Oct. 19, 2012, 8 pages.
International Search Report and Written Opinion for Application No. PCT/US2012/042329, mailed on Feb. 22, 2013, 28 pages.
International Search Report and Written Opinion for Application No. PCT/US2013/029414, mailed on Jun. 26, 2013, 7 pages.
International Search Report and Written Opinion for Application No. PCT/US2013/029424, mailed on Jun. 21, 2013, 9 pages.
International Search Report and Written Opinion for Application No. PCT/US2013/029443, mailed on Jun. 21, 2013, 13 pages.
International Search Report for Application No. PCT/US06/015129, mailed on Sep. 20, 2006, 1 page.
International Search Report for Application No. PCT/US06/15130, mailed on Nov. 22, 2006, 1 page.
International Search Report for Application No. PCT/US06/15132, mailed on May 10, 2007, 1 page.
International Search Report for Application No. PCT/US06/15133, mailed on Jun. 6, 2007, 1 page.
International Search Report for Application No. PCT/US2005/12563, mailed on Aug. 10, 2005, 1 page.
International Search Report for Application No. PCT/US2006/15125, mailed on Jan. 11, 2007, 1 page.
International Search Report for Application No. PCT/US2006/15126, mailed on Apr. 3, 2008, 1 page.
International Search Report for Application No. PCT/US2010/047371 mailed on Apr. 29, 2011, 3 pages.
International Search Report for Application No. PCT/US2010/050339 mailed on Dec. 13, 2010, 5 pages.
International Search Report for Application No. PCT/US2011/48686 mailed on Apr. 9, 2012, 5 pages.
International Search Report for Application No. PCT/US2012/024900 mailed on Oct. 19, 2012, 4 pages.
International Search Report for Application No. PCT/US2012/42329 mailed on Feb. 22, 2013, 13 pages.
Issue Rolling Stones Magazine, Film Rentals by Vending Machine, 1982.
Picture of U.S. Installation of Japanese Manufactured VHS Rental Kiosk, 1984.
Supplemental European Search Report for Application No. EP05736275 mailed on Jan. 21, 2009, 2 pages.
Supplemental European Search Report for Application No. EP10810691 mailed on Feb. 26, 2013, 3 pages.
Supplemental European Search Report for Application No. EP10814374 mailed on Jan. 16, 2015, 4 pages.
Supplemental European Search Report for Application No. EP10814375 mailed on Jan. 16, 2015, 4 pages.
Supplemental European Search Report for Application No. EP10815879 mailed on Mar. 19, 2013, 2 pages.
Supplemental European Search Report for Application No. EP11820476 mailed on Jun. 22, 2015, 2 pages.
Supplemental European Search Report for Application No. EP12799917 mailed on Sep. 19, 2014, 2 pages.
Supplementary European Search Report for Application No. EP05736275, mailed on Jan. 30, 2009, 3 pages.
Technophobe's best friend by MaClatchy, Smith Erika, McClatchy-Tribune Business news Oct. 22, 2007.

* cited by examiner

SYSTEM AND METHOD FOR SUBSTITUTING A MEDIA ARTICLE WITH ALTERNATIVE MEDIA

CROSS-REFERENCE TO RELATED APPLICATION

This application is a continuation application of U.S. patent application Ser. No. 13/517,565, filed on Jun. 13, 2012, entitled "SYSTEM AND METHOD FOR SUBSTITUTING A MEDIA ARTICLE WITH ALTERNATIVE MEDIA", which claims priority from U.S. Provisional Patent Application No. 61/497,012, filed on Jun. 14, 2011, entitled "SYSTEM AND METHOD FOR SUBSTITUTING A MEDIA ARTICLE WITH ALTERNATIVE MEDIA", both of which are incorporated herein by reference in its entirety.

TECHNICAL FIELD

This invention relates to a system and method for substituting a media article with alternative media. More particularly, the present invention provides a system and method for determining corresponding digital alternative media selections at an associated content provider as a substitution for a physical media article at an article dispensing machine.

BACKGROUND AND SUMMARY OF THE INVENTION

While the present invention is often described herein with reference to a digital video disc, Blu-Ray disc, and video game distribution system, an application to which the present invention is advantageously suited, it will be readily apparent that the present invention is not limited to that application and can be employed in article dispensing systems used to distribute a wide variety of dispensable articles.

The digital video disc (DVD) player has been one of the most successful consumer electronics product launches in history. The market for DVD movie video, Blu-Ray movie video, and video game rentals is enormous and growing. Millions of households have acquired DVDs since they were introduced in 1997. In the first quarter of 2003 alone, it was estimated that well over three million DVD players were shipped to U.S. retailers.

In 2003, brick-and-mortar stores dominated the movie video and video game rental landscape in the U.S. Statistics showed that two brick-and-mortar companies controlled nearly sixty-five percent of the home video rental business. One element repeatedly cited for success of certain brick-and mortar store video rental franchises was perceived high availability of new video releases. Consumers want entertainment on demand, and through stocking multiple units of each new release, successful brick-and-mortar companies meet this consumer demand.

The foregoing indicates that there is a significant market potential for aligning regular routines of consumers (e.g., shopping, getting coffee or gas or going to a convenience store) with their DVD, Blu-Ray, and video game rental activities.

One improved article dispensing machine is disclosed in commonly owned U.S. Pat. No. 7,234,609, which is herein incorporated by reference in its entirety. The invention of the U.S. Pat. No. 7,234,609 and the present invention can function as an article dispensing machine-based distribution system that will typically have multiple units of each new release per article dispensing machine. The dispensing machines of the U.S. Pat. No. 7,234,609 and the present invention can stock up to two thousand DVDs, Blu-Ray, video games, or other discs (movies, games or other entertainment content), making the system competitive with existing brick-and-mortar video rental superstores.

The dispensing machine and system of the U.S. Pat. No. 7,234,609 and the present invention distinguishes itself from such stores by offering major benefits not conventionally offered by such stores, including additional cross-marketing programs (e.g., promotional rentals for a certain amount of dollars spent at the retail location) and convenience (e.g., open always).

The dispensing machine of the U.S. Pat. No. 7,234,609 and the present invention yields a competitive advantage in the DVD, Blu-Ray disc, and video game rental marketplace by offering consumers cross-marketing/promotional programs, convenience of selection (e.g., computer-based searches for movies and recommendations based on consumer profiles), and potentially extended hours. The present invention employs a more cost-effective, convenient platform than brick-and-mortar stores. In addition, with the present invention, dispensing machines can be situated in retail locations having high foot traffic, such as at a popular grocery store, restaurant, drug store, and/or other popular retail location.

The dispensing machine of the U.S. Pat. No. 7,234,609 and the present invention can be operated at a substantial savings over the costs associated with traditional brick-and-mortar video rental stores. For example, the present invention does not require hourly employees manning the dispensing machines or restocking them with inventories, due to the ability of the article transport storage units to be delivered to/picked up from retail locations by third-party delivery services, such as traditional or contracted courier services.

Unlike brick-and-mortar stores, the dispensing machine of the U.S. Pat. No. 7,234,609 and the present invention does not require an on-site store manager because all operational decisions can be made at a centralized location by a management team officed remote from the retail locations. Unlike brick-and-mortar stores, the dispensing machine of the U.S. Pat. No. 7,234,609 and the present invention does not require significant physical space. Unlike brick-and-mortar stores, the dispensing machine of the U.S. Pat. No. 7,234,609 and the present invention has low operating costs because no heating or air conditioning is required for the dispensing machines and they consume a relatively low level of electrical energy. In addition, the dispensing machine of the U.S. Pat. No. 7,234,609 has low maintenance costs and downtime.

The dispensing machine of the U.S. Pat. No. 7,234,609 and the present invention addresses the shortcomings of traditional brick-and-mortar stores in a convenient and cost-effective delivery vehicle having the added bonus of serving as an effective promotional platform that drives incremental sales to retail locations. In addition, the dispensing machine of the U.S. Pat. No. 7,234,609 and the present invention overcomes these disadvantages by at least offering more new releases and older selections for any given time period, and lower cost per viewing with significantly more convenience than Internet-based and pay-per-view services.

The dispensing machine of the U.S. Pat. No. 7,234,609 and the present invention is a fully automated, integrated DVD, Blu-Ray, and video game rental and/or purchase systems. It preferably incorporates robust, secure, scalable software that provides a fully personalized user experience and real-time feedback to retail locations and advertisers, scalable hardware that leverages existing technologies such as touch screen, focused audio speakers and video monitors, technology utilizing the Internet through a system website or mobile/consumer electronics device application, and an article transport storage unit that facilitates the exchange of new discs for old discs in each machine with virtually no need for human intervention. These technologies and others fill long-felt needs in the art and give advantages over conventional video distribution options. The dispensing machine of the U.S. Pat. No. 7,234,609 and the present invention functions as much as a promotional platform as it does a rental kiosk.

By utilizing the dispensing machines and the fully-interactive, real-time, linked Internet website or mobile/consumer electronics device application, consumers can rent one or more DVDs, Blu-Ray discs, video games, or other entertainment content directly from dispensing machines as well as indirectly by making a rental reservation through the website or application for later pickup at a conveniently located machine. These dispensing machines are preferably networked with each other, with the inventory control and/or supply office and with the system website or application by phone-line, DSL, wireless network, or other Internet connection at each retail location. Through this linked network, the rental experience for each consumer can be customized based on a profile for each consumer, such as via personalized home pages and rental screens.

With article dispensing machines, there exists the potential for a customer to attempt to rent a particular movie, television show, or video game disc and find that it is out-of-stock or otherwise unavailable. Conventional article dispensing machines may direct the customer to a nearby article dispensing machine that has the particular disc in stock. While this option may be useful to some customers, it may be inconvenient for other customers to travel to another location. Still other customers may abandon their attempt to rent the particular title from the article dispensing machine and instead patronize another media rental company, a video on demand provider, a downloadable video game provider, an online video or video game streaming provider, or other content provider. In this case, the revenue associated with the rental transaction is lost and the customer may be dissatisfied with their experience with the article dispensing machine. In other situations, a customer at a conventional article dispensing machine desires to rent an in-stock DVD, Blu-ray disc, or video game disc but is not informed of other options available through the machine, including renting related titles or obtaining access to a corresponding digital media selection. This could result in a missed opportunity to build or further a customer relationship, and/or to create a rental or purchase transaction.

The present invention permits a customer to substitute digital alternative media for a physical media article at an article dispensing machine, if the media article is available and in-stock or if the media article is unavailable because it is out-of-stock or reserved to another customer. By offering substitute alternative media, the present invention assists in retention of customers and revenue. Moreover, the content provider receives marketing exposure on the article dispensing machine, which may enhance the value of the content provider's subscription packages. The present invention overcomes disadvantages of conventional article dispensing machines by showing alternative media that correspond to the media article at the article dispensing machine. In one aspect of the present invention, an associated content provider is identified using a unique customer identifier that also applies to the article dispensing machine. In another aspect of the present invention, a customer subscription for the associated content provider is accessed so that the alternative media is determined if the customer subscription allows access to the alternative media. In another aspect of the present invention, determining the alternative media corresponding to the media article is based on matching of the metadata of the media article and the alternative media. In yet another aspect of the present invention, the associated content provider is identified by a user through providing a linkage of the associated content provider to a customer account through a user interface or on a website interface. Other features and advantages are provided by the following description and drawings.

DETAILED DESCRIPTION OF THE INVENTION

Figure 1:
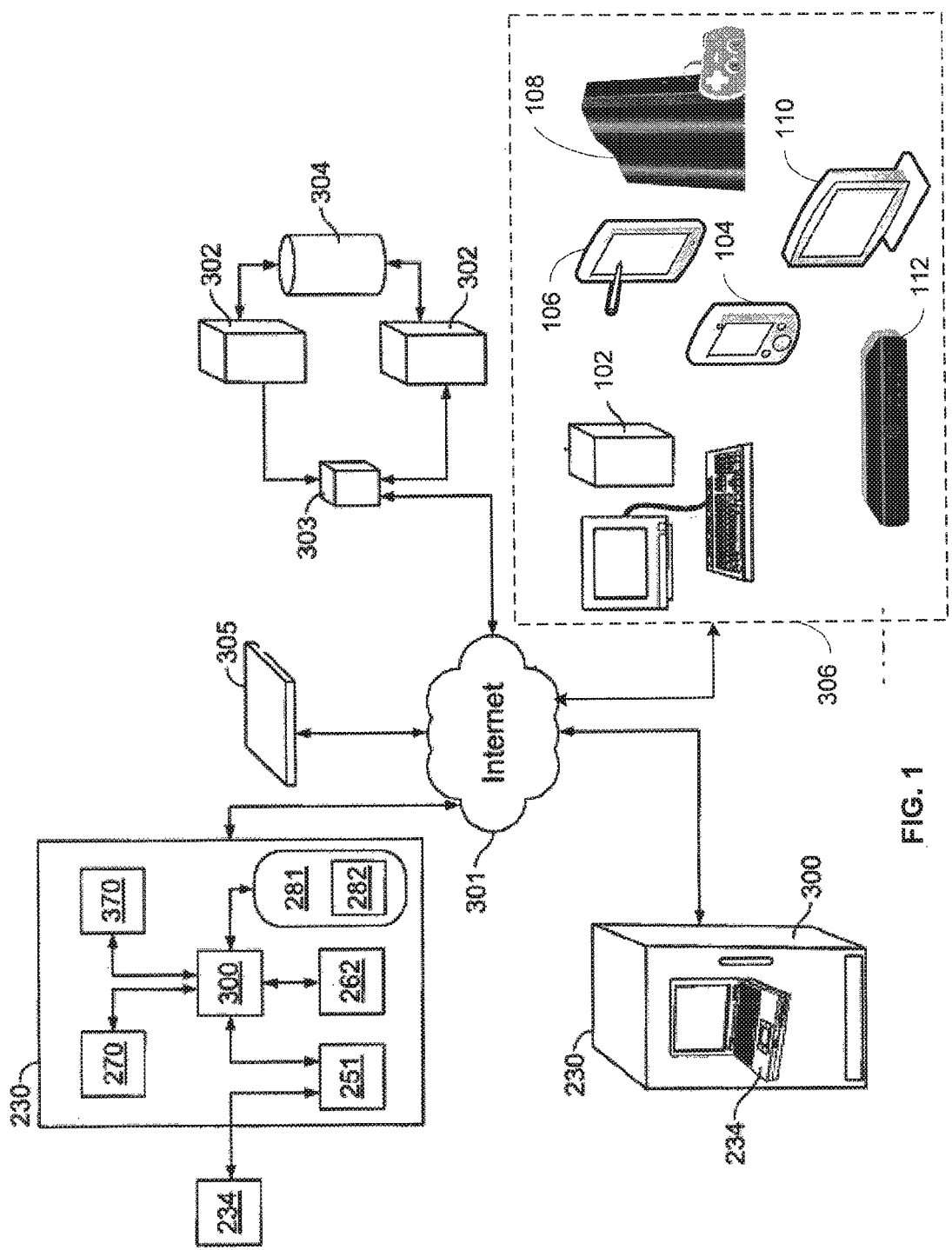
FIG. 1 is an illustration of a system for communicating and processing information in a network of article dispensing machines and dispensing apparatus.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
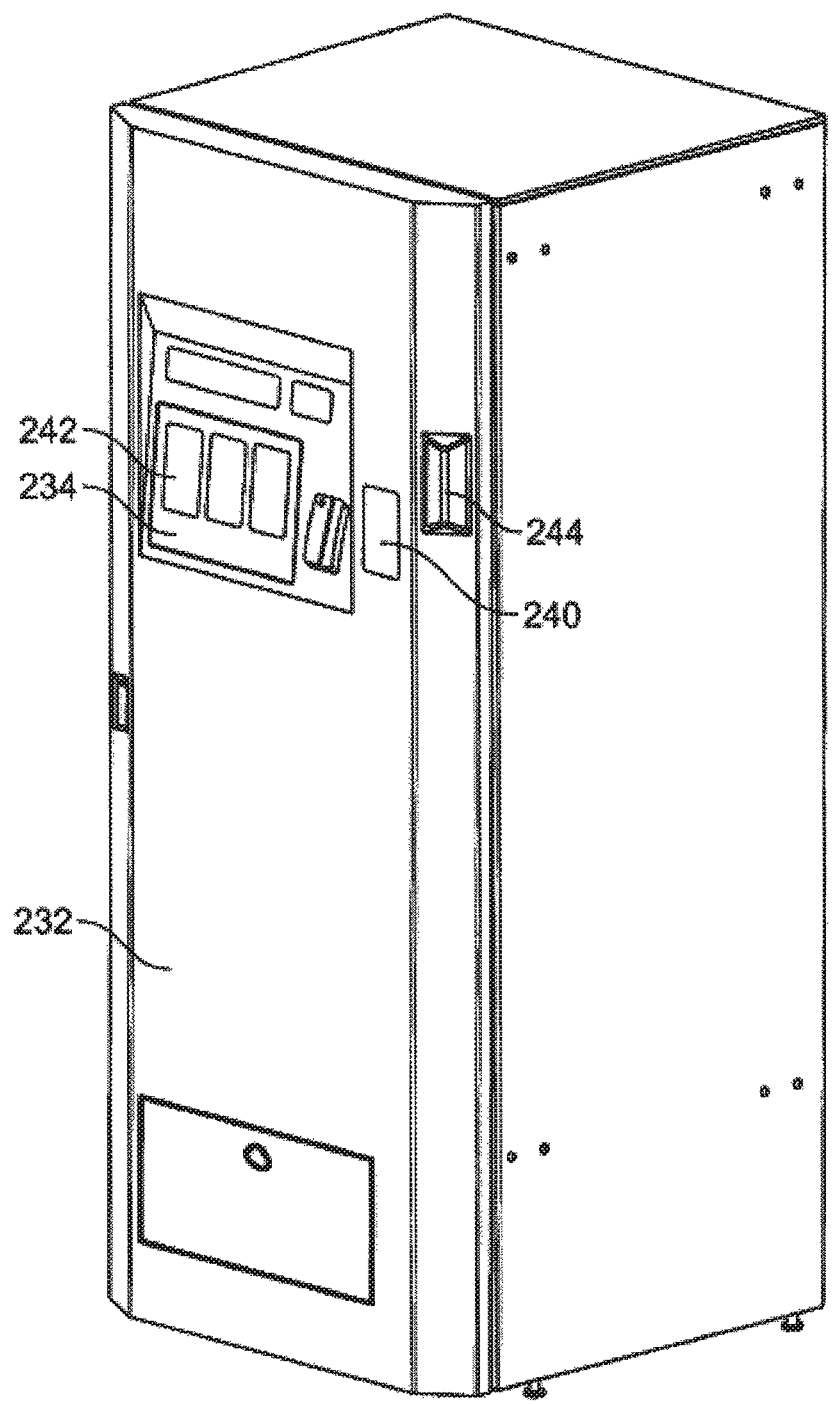
FIG. 2 is a perspective view of an article dispensing machine constructed in accordance with the principles of the present invention.

FIGS. 1-2 illustrate an article dispensing machine designated 230. Article dispensing machine 230 is one of a plurality of article dispensing machines included within an article distribution system having a plurality of such machines situated at a plurality of retail locations. The article dispensing machines of a particular article distribution system preferably form a network. As such, those machines are preferably in electrical communication with each other and with a central server or central controller.

As shown in FIG. 1, each article dispensing machine 230 includes a dispensing machine processor 300, also referred to herein as a vending controller, which is connected to a first sensor 270 and a second sensor 370, a first motor 251 and a second motor 262 and a user interface control system 234, collectively referred to as "the peripheral devices." The processor is capable of executing various programs to provide input to and/or receive outputs from the peripheral devices. Suitable processors for such use are known to those of skill in the art. In addition, the processor is operably connected to at least one memory storage device 281, such as a hard-drive or flash-drive or other suitable memory storage device.

Article dispensing machine memory storage device 281 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, article dispensing machine memory storage device 281 may incorporate electronic, magnetic, optical, and/or other types of storage media. Article dispensing machine memory storage device 281 can have a distributed architecture where various components are situated remote from one another, but are still accessed by processor. Article dispensing machine memory storage device includes an article dispensing machine database 282.

The article dispensing machines 230 preferably comprise a network of machines in communication with one another. As shown in FIG. 1, in the preferred configuration, the article dispensing machines 230 are networked with one another via a central server or central controller 302 in a hub-and-spoke system. However, optionally, the article dispensing machines may be connected and communicate directly with one another, and/or subsets of article dispensing machines may communicate with one another directly as well as with the central server 302.

Figure 3:
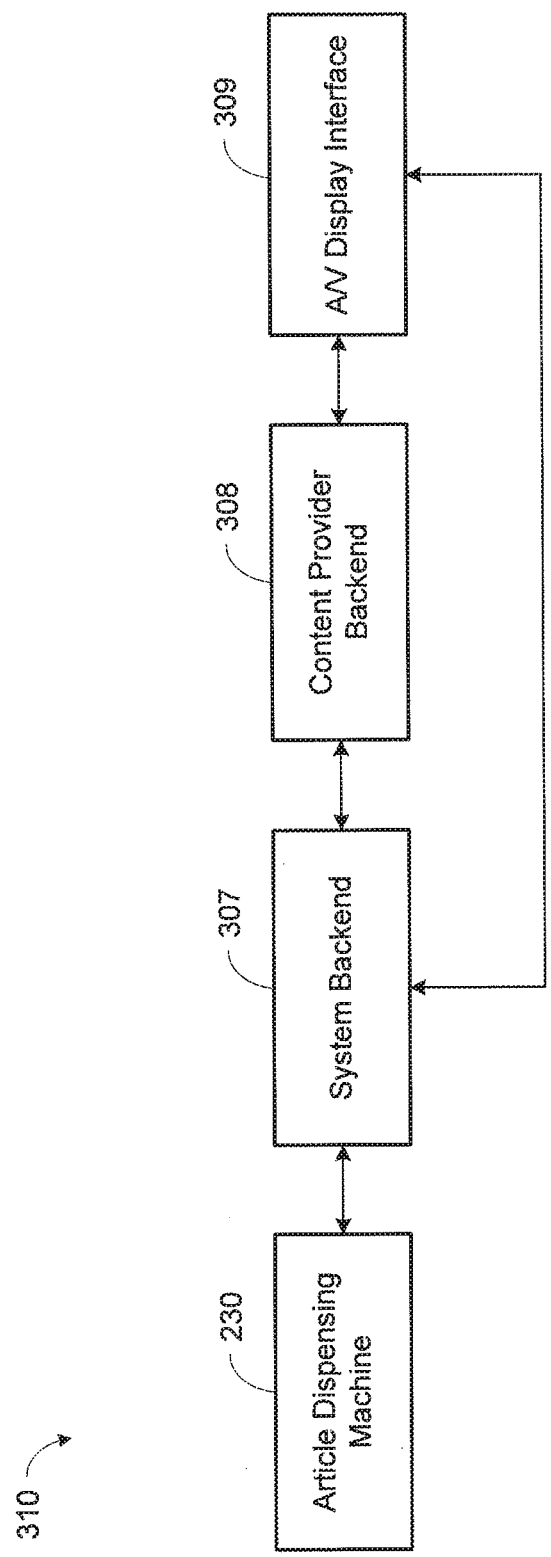
FIG. 3 is a high-level block diagram illustrating a networked media content system and connections including an article dispensing machine, a system backend, a content provider backend, and an A/V display interface.

Generally, in terms of hardware architecture, the central server 302 and the content provider backend 308 shown in FIG. 3 include a central processor and/or controller, central memory, and one or more input and/or output (I/O) devices (or peripherals) that are communicatively coupled via a local interface. The architecture of the central server 302 is set forth in greater detail in U.S. Pat. No. 7,234,609, the contents of which are incorporated herein by reference. Numerous variations of the architecture of the central server 302 and the content provider backend 308 would be understood by one of skill in the art and are encompassed within the scope of the present invention.

The processor/controller is a hardware device for executing software, particularly software stored in memory. The processor can be any custom made or commercially available processor, a central processing unit (CPU), an auxiliary processor among several processors associated with the server 302, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc., or a 68xxx series microprocessor from Motorola Corporation. The processor may also represent a distributed processing architecture such as, but not limited to, SQL, Smalltalk, APL, KLisp, Snobol, Developer 200, MUMPS/Magic.

The software in memory may include one or more separate programs. The separate programs comprise ordered listings of executable instructions for implementing logical functions. The software in memory includes a suitable operating system (O/S). A non-exhaustive list of examples of suitable commercially available operating systems is as follows: (a) a Windows operating system available from Microsoft Corporation; (b) a Netware operating system available from Novell, Inc.; (c) a Macintosh operating system available from Apple Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers, smartphones, or personal digital assistants (PDAs) (e.g., PalmOS available from Palm Computing, Inc., Windows CE or Windows Phone available from Microsoft Corporation, iOS available from Apple Inc, Android available from Google Inc., BlackBerry OS available from Research in Motion Limited, Symbian available from Nokia Corp.). The operating system essentially controls the execution of other computer programs and provides scheduling, input-output control, file and data management, memory management, and communication control and related services.

Steps and/or elements, and/or portions thereof of the present invention may be implemented using a source program, executable program (object code), script, or any other entity comprising a set of instructions to be performed. When a source program, the program needs to be translated via a compiler, assembler, interpreter, or the like, which may or may not be included within the memory, so as to operate properly in connection with the operating system (O/S). Furthermore, the software embodying the present invention can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, Ada, and Lua.

When article dispensing machine 230 is in operation, the article dispensing machine processor is configured to execute software stored within article dispensing machine memory, to communicate data to and from the dispensing machine memory, and to generally control operations of article dispensing machine pursuant to the software. The software aspects of the present invention and the O/S, in whole or in part, but typically the latter, are read by processor, perhaps buffered within the processor, and then executed.

When the present invention or aspects thereof are implemented in software, it should be noted that the software can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The present invention can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

For communication with the central server 302, article dispensing machine 230 is equipped with network communication equipment and circuitry. In a preferred embodiment, the network communication equipment includes a network card such as an Ethernet card. In a preferred network environment, each of the plurality of article dispensing machines 230 on the network is configured to use the TCP/IP protocol to communicate via the network 301. It will be understood, however, that a variety of network protocols could also be employed, such as IPX/SPX, Netware, PPP, and others. It will also be understood that while a preferred embodiment of the present invention is for article dispensing machine 230 to have a "broadband" connection to the network 301, the principles of the present invention are also practicable with a dialup connection using a standard modem. Wireless network connections are also contemplated, such as wireless Ethernet, satellite, infrared, radio frequency, Bluetooth, near field communication, and cellular networks.

The central controller 302 communicates with the article dispensing machine controllers 300 via the network 301. The central controller 302 is preferably located at a central station or office that is remote from the plurality of article dispensing machines 230. The central controller 302 can operate as the server for communicating over the network 301 between the plurality of article dispensing machines 230. The central controller 302 receives communications and information from the article dispensing machines 230, and also transmits communications and information to the machines 230. For example, when a rental transaction is performed at the article dispensing machine 230, transaction data such as the rented title is then transmitted from the machine 230 to the central controller 302 via the network 301. It will be understood that central servers in general, such as the central controller 302, are often distributed. A plurality of central servers/controllers 302 may optionally be arranged in "load balanced" architecture to improve the speed and efficiency of the network. To accomplish the implementation of multiple controllers 302, the controllers 302 may be in communication with a router/distributor 303.

The central controller 302 is also in communication with a central database 304. The central database 304 stores information regarding the transaction network. For example, the central database 304 stores data regarding the vending inventory at each of the plurality of article dispensing machines 230. The central database 304 also stores sales information regarding the sales quantities of the vending merchandise stored in the machines 230. For example, the central database 304 stores information regarding the sales totals for each title and for each machine 230 vending location. Central database 304 also stores user information and rental transaction information, such as user IDs, the date on which discs are due to be returned, the date on which discs were rented from the machines 230 and a list of valid coupon codes and restrictions associated with those codes. In certain embodiments, central database 304 also may be configured to store user PINs. Some of this information is also preferably stored in article dispensing machine database 282.

Central database 304 and databases in the content provider backend 308, such as the content provider customer profile database 502 and other databases, are preferably relational databases, although other types of database architectures may be used without departing from the principles of the present invention. For example, the databases 304 and 502 may be a SQL database, an Access database or an Oracle database, and in any such embodiment have the functionality stored herein. Central database 304 is also preferably capable of being shared, as illustrated, between a plurality of central controllers 302 and its information is also preferably capable of being transmitted via network 301. It will be understood that a variety of methods exist for serving the information stored in central database 304 and database 502. In one embodiment, .net and Microsoft Reporting Services are employed, however, other technologies such as ODBC, MySQL, CFML and the like may be used.

The central controller 302, central database 304, and components of the content provider backend 308 are also accessible by an electronic device 306, which may include a personal computer 102, mobile device 104 (e.g., smartphone, personal digital assistant, etc.), tablet computer 106, video game console 108, television 110, and Blu-Ray player 112. The electronic device 306 may be in direct or indirect communication with the central controller 302, central database 304, and/or the content provider backend 308 through a wired and/or wireless network connection, such as Ethernet, Wi-Fi, cellular (3G, 4G, etc.), or other type of connection. As a personal computer 102, the electronic device 306 will be understood as comprising hardware and software consistent with marketable personal and laptop computers, such as a display monitor, a keyboard, and a microprocessor. The electronic device 306 may also comprise Internet browser software such as Firefox, Internet Explorer, Chrome, or Safari. Using the browser software, a user of the electronic device 306 can access a web interface through the central controller 302. An application may also execute on the electronic device 306 that accesses the central controller 302. To that end, central controller 302 preferably comprises web server software such as IIS or Apache. It will be understood that a variety of web server software and web browser software exists to implement the principles of the present invention without departing therefrom. Through the web browser software or application, the electronic device 306 communicates with the central controller 302 and allows the user to login to a central command functionality of the central controller 302 and to view and modify data stored in the central database 304. The browser interface or application also allows the user to perform certain system functions, which will affect the inventory and behavior of the article dispensing machines 230.

In a preferred embodiment, a financial server 305 is also in communication with the network 301. It will be understood that a variety of financial services exist for processing financial information via the Internet and other networks 301. Those services allow for the processing of credit card and debit card information, so that users of the services do not have to interface directly with credit and debit card companies. In FIG. 1, the financial server 305 is illustrated as a single server, although the financial server 305 may comprise an entire sub-network of financial servers 305 responsible for processing financial information.

As shown in FIG. 2, article dispensing machine 230 includes a machine housing 232 with front, rear, top, bottom and side panels. The machine housing 232 is preferably a combination molded fiberglass and sheet metal cabinet. However, those skilled in the art will appreciate that the housing can be constructed from a variety of other suitable materials and with a variety of other suitable manufacturing techniques.

As shown most clearly in FIG. 2, a user interface portion 234 of housing 232 includes a card reader 240, a keypad and/or touch screen 242 and an article transfer opening 244. The card reader 240 is preferably designed in known fashion to read magnetically encoded membership and/or credit/debit cards for authorizing the distribution of articles of inventory through the article transfer opening 244. Keypad and/or touch screen 242 permits consumers and/or inventory stocking personnel to communicate with the dispensing machine 230 and/or a central office linked in electrical communication with the dispensing machine. Keypad and/or touch screen 242 also permits consumers and/or inventory stocking personnel to enter appropriate commands directed to carrying out specific machine tasks. It will be appreciated that the optional touch screen includes a monitor made with known technologies making it capable of being utilized as a user interface for entry of commands designed to carry out machine tasks. The touch screen 242 may also be capable of displaying a QR (Quick Response) code to a customer. The customer may read the QR code with a camera on a mobile device or with a dedicated QR code reader. The QR code can represent a universal resource locator (URL) to access a digital media selection, for example.

Furthermore, it will be appreciated that additional user interface portions having additional or even identical user interface components could be incorporated within article dispensing machine 230. For example, these components could be incorporated on other panels of the housing 232 of machine 230 so that the machine can be used simultaneously by multiple consumers, translating into more efficient distribution of articles in high traffic areas. Dispensing machine 230 also preferably includes speaker units. Known audio technology may be incorporated within dispensing machine 230 to broadcast focused audio directed to relatively small (e.g., three square feet) locations in front of the machines from speaker units and/or in other designated locations at a retail site.

FIG. 3 illustrates a networked media content system 310 including an article dispensing machine 230, a system backend 307, a content provider backend 308, and an audio/visual (A/V) display interface 309. The networked media content system 310 provides for a variety of processes involving management, manipulation, searching, presentation, and notification related to digital content and vendible physical media articles, including processes related to the present invention for substitution of a physical media article with digital alternative media. The networked media content system 310 allows for direct and indirect communication between the components in the networked media content system 310 via one or more networks. The components in the networked media content system 310 may be operated by one or more entities. In one embodiment, the article dispensing machine(s) 230 and the system backend 307 are operated by a first entity, such as the operator of the article dispensing machines, while the content provider backend 308 and the A/V display interface 309 are operated by a second entity, such as a content provider. In another embodiment, all of the components shown in the networked media content system 310 of FIG. 3 are operated by the same entity. The physical media article may include at least a DVD, Blu-Ray disc, video game disc, or other media article, including those that are out-of-stock or otherwise unavailable for rental. The digital alternative media may include streaming video content, video-on-demand content, downloadable video content, streaming video games, downloadable video games, or other digital media. Although FIG. 3 shows a single content provider backend 308 and a single A/V display interface 309, it is contemplated that more than one content provider backend and/or A/V display interfaces may be in communication with the system backend 307.

The system backend 307 includes components that primarily communicate information, such as transaction and inventory data, to and from the article dispensing machines 230. Components in the system backend 307 also communicate information to and from the content provider backend 308 and the A/V display interface 309. The system backend 307 is detailed below with reference to FIG. 4. The content provider backend 308 includes components that primarily communicate information to and from the A/V display interface 309. Components in the content provider backend 308 also communicate information to and from the system backend 307, as detailed further below. Data communicated between the article dispensing machines 230, the system backend 307, the content provider backend 308, and/or the A/V display interface 309 may utilize the XML (Extensible Markup Language) format.

The A/V display interface 309 can be a set-top box, a module of an internet-ready television, a Blu-Ray player with internet connectability, a software application executing on a mobile device, cable television converter box, satellite television set-top box, IPTV (Internet Protocol television) set-top box (including AT&T U-Verse), digital video recorder, tablet computer, video game console (including Microsoft Xbox family, Sony PlayStation family, Nintendo Wii, and similar devices), handheld gaming device (including Sony PlayStation Portable, Nintendo DS, and similar devices), laptop computer, desktop computer, streaming media box (including Apple TV, Google TV, Roku, Boxee, and similar devices), or any other device capable of receiving and displaying streaming, on-demand, and/or downloadable electronic media from a content provider. Moreover, applications may be installed and executed on the A/V display interface 309 that communicate with the system backend 307 and/or the content provider backend 308 to provide media content and other information to a user of the A/V display interface 309.

The article dispensing machines 230 can communicate with the system backend 307, including the central server and controller 302, via network communication equipment and circuitry, as detailed above. Furthermore, the system backend 307 can communicate with the content provider backend 308 and the A/V display interface 309 via the same or different network communication equipment and circuitry. In particular, the system backend 307 can directly communicate with the content provider backend 308 and the A/V display interface 309, or in one embodiment, the system backend 307 can communicate with the A/V display interface 309 through the content provider backend 308. It will also be understood that while a preferred embodiment of the present invention is for the components of the system 310 to have a "broadband" connection with one another, the principles of the present invention are also practicable with a dialup connection using a standard modem. Wireless network connections are also contemplated, such as wireless Ethernet, satellite, infrared, radio frequency, Bluetooth, near field communication, and cellular networks.

Each of the article dispensing machines 230 may operate without requiring continuous connectivity and communication with the central controller 302. In one embodiment, the central controller 302 only transmits data in response to communication from an article dispensing machine 230. For example, an article dispensing machine 230 may attempt to communicate with the central controller 302 following completion of one or more rental transactions or one or more media article return transactions. In another embodiment, the article dispensing machine 230 continues normal operations and transactions even if communication is interrupted or cannot be established with the central controller 302. In these cases, transaction data can be stored locally in the article dispensing machine 230, such as in the article dispensing machine memory storage device 281, until a predetermined time interval elapses, when a predetermined number of transactions is reached, or until communication with the central controller 302 can be reestablished. Once communication is established with the central controller 302, financial and inventory information can be uploaded and the appropriate servers and databases can be updated.

In one embodiment, the article dispensing machine 230 can display only media articles which are physically located at the article dispensing machine 230. In this way, a customer may browse on the user interface 234 only the media articles which are in-stock and available to rent at that article dispensing machine 230. Typically, the article dispensing machine 230 possesses media information for the media articles that are currently located in the article dispensing machine 230. The media information for a media article includes title, actor, director, studio, publisher, plot synopsis, format, description, parental rating, individualized ratings and reviews, popularity, article type, running time, genre, cover artwork, or other information. The article dispensing machine 230 can also possess the media information for recently-rented media articles that are no longer physically stored in the article dispensing machine 230. The article dispensing machine 230 can communicate with the central controller 302 when media information about a particular media article is needed. For example, when a particular media article is returned to an article dispensing machine 230 that does not have the corresponding media information for that particular media article, the article dispensing machine 230 can query the central controller 302, metadata database 410, and/or inventory database 412 for the media information. Once the media information is obtained, the article dispensing machine 230 may display that particular media article on the user interface 234 as in-stock and available to rent. A physical media article may be substituted with a digital alternative media selection, as described further below.

In another embodiment, the article dispensing machine 230 can display media articles that are both physically located and not physically located at the article dispensing machine 230. In this embodiment, media articles which are both available and unavailable to rent can be displayed. A media article may be unavailable to rent if it is not in-stock or is in-stock but has been reserved for rental. In one example, the entire catalog of media articles stored in the inventory database 412 can be displayed on the article dispensing machine 230. In another example, a subset of the entire catalog of media articles can be displayed on the article dispensing machine 230. The subset of media articles that can be displayed on the article dispensing machine 230 may be determined, for example, based on geographic location, retailer agreements, contractual obligations, customer rental habits, and other criteria. The media articles that can be displayed on the article dispensing machine 230 may include recently-rented media articles that are no longer physically stored in the article dispensing machine 230 or media articles that have never been physically in the article dispensing machine 230. For example, media articles that have never been physically in the article dispensing machine 230 may be displayed because those media articles may be available at a nearby article dispensing machine. In this case, those media articles may be displayed to the customer so that the customer has an option to obtain those media articles from the nearby article dispensing machine 230. In this embodiment, if a customer attempts to rent a media article that is out-of-stock, reserved for another customer, or otherwise cannot be vended at the particular article dispensing machine 230, then that media article can be deemed an unavailable media article. Although a physical unavailable media article cannot be rented from the particular article dispensing machine 230, a digital alternative media selection may be available and substituted for the unavailable media article, as described further below.

Figure 4:
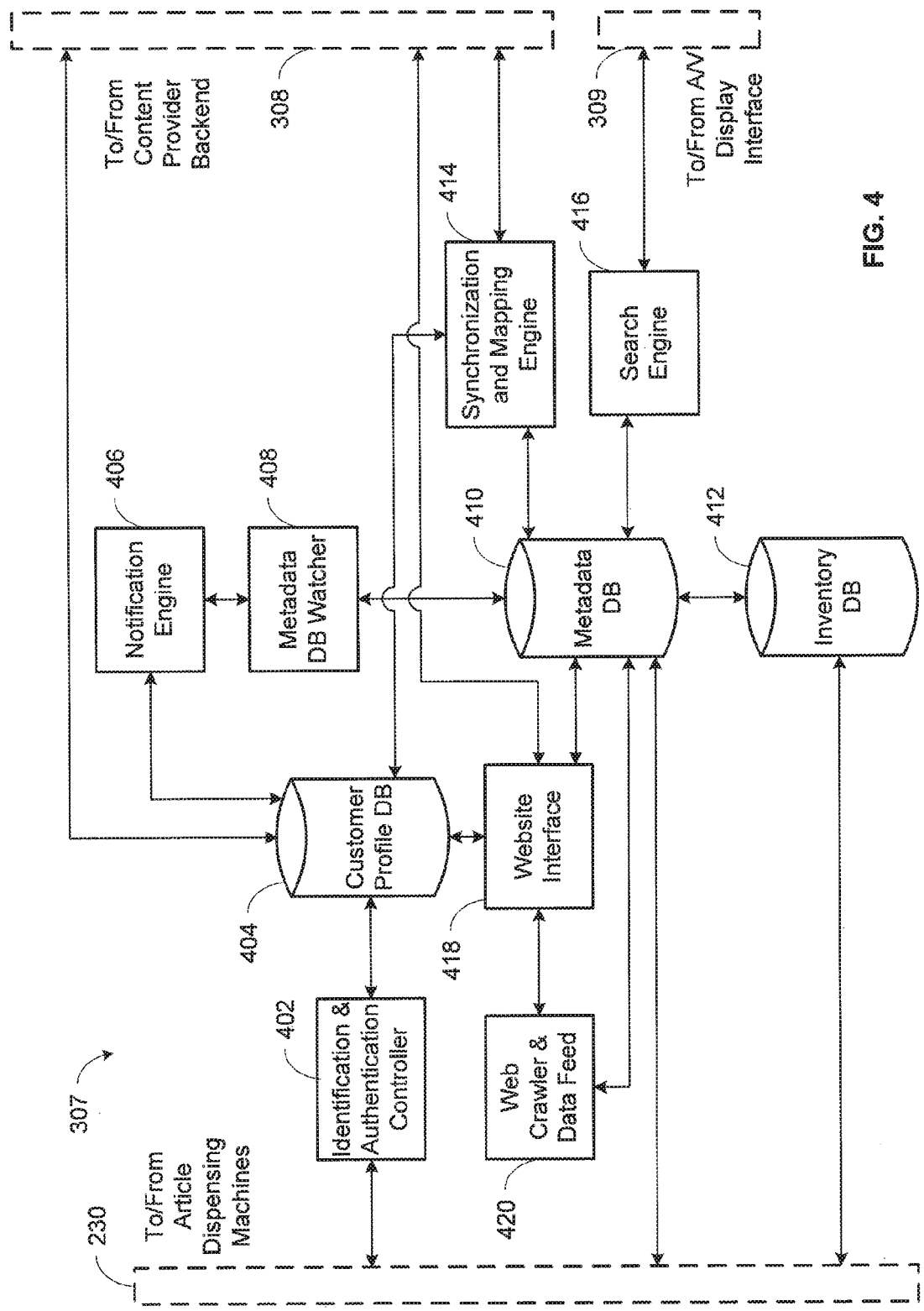
FIG. 4 is a block diagram illustrating the system backend.

FIG. 4 is a block diagram illustrating the system backend 307 and connections to and from the system backend 307 to the article dispensing machines 230, the content provider backend 308, and the A/V display interface 309. The system backend 307 includes components that provide and receive data to and from the article dispensing machines 230 during DVD, Blu-Ray disc, and video game rental transactions and other transactions. Components in the system backend 307 are utilized in relation to the present invention for substitution of a physical media article with digital alternative media, as described below. It will be understood that components 402, 404, 406, 408, 414, 416, 418, and 420 in the system backend 307 may be implemented, for example, by the central controller 302 using instructions stored in a memory connected to the central controller 302. It will be further understood that the databases 404, 410, and 412 may be implemented as part of the central database 304 or as separate databases.

The identification and authentication controller 402 can receive a unique customer identifier that a customer provides to the article dispensing machines 230 during a rental transaction. The unique customer identifier can be a credit or debit card number, a hashed version of a credit or debit card number, or other unique identifier used for payment and/or identification purposes. In the case of hashing of the credit or debit card number, the hash function applied to the credit or debit card number is preferably implemented on the article dispensing machines 230 and may be, for example, a SHA-256 hashing algorithm. The identification and authentication controller 402 can validate the payment capability of a credit or debit card by communicating with the financial server 305.

Figure 5:
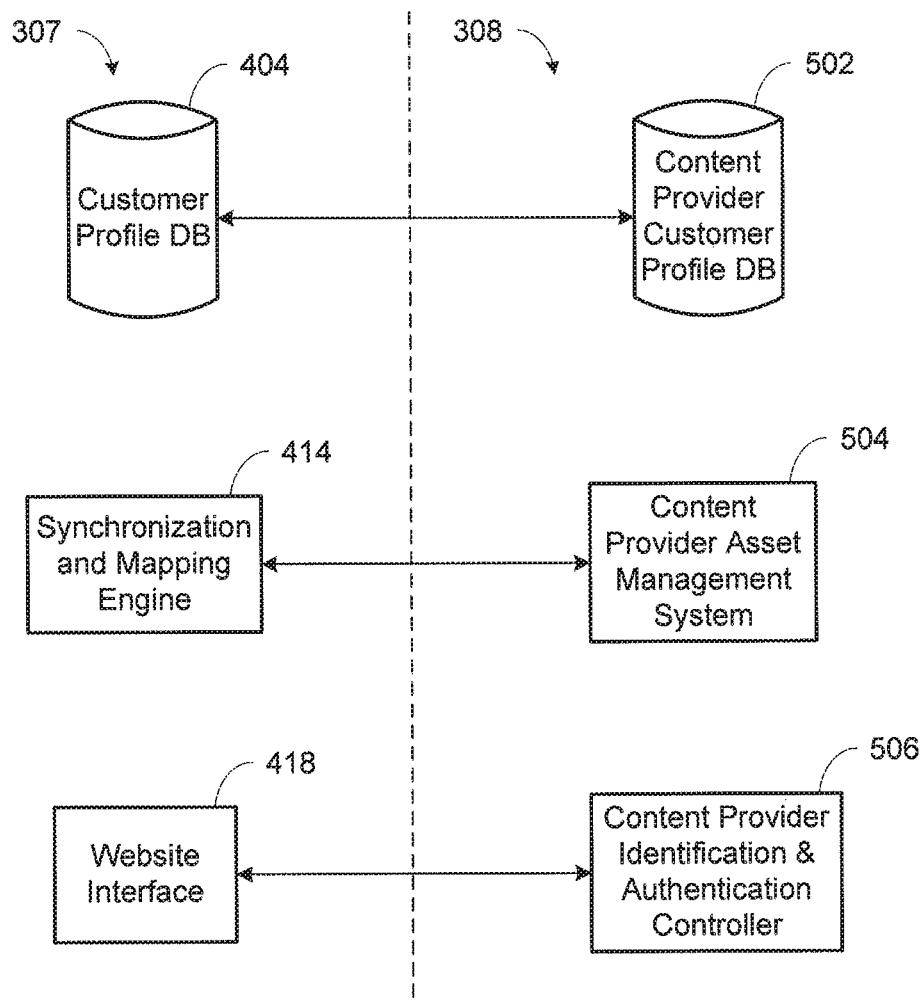
FIG. 5 is a block diagram illustrating connections between the system backend and the content provider backend.

A customer may be authenticated to multiple customer profiles and accounts by the identification and authentication controller 402. The unique customer identifier provided by the customer can authenticate the customer to an existing customer profile and account for the article dispensing machines 230. The existing customer profile and account can be stored and looked up using the unique customer identifier in the customer profile database 404 that is connected to the identification and authentication controller 402. The unique customer identifier can also link the existing customer account to a content provider customer account via a connection from the customer profile database 404 to the content provider customer profile database 502 in the content provider backend 308, as shown in FIG. 5. Zero, one, or more content provider customer accounts may be linked in the customer profile database 404 to the existing customer account for the article dispensing machines 230. A content provider may include, but is not limited to, a cable television operator, a satellite television service provider, an IPTV (Internet Protocol television) provider, an online gaming and digital media delivery service (Xbox Live, PlayStation Network, OnLive, etc.), a website (YouTube, Hulu, etc.), a movie studio, a television network, a game publisher, or a retailer (Best Buy, Walmart, etc.). Media selections available from a content provider may include videos on demand, streaming videos, downloadable videos, streaming video games, or downloadable video games. The media selections may be available through the A/V display interface 309 that is in communication with the content provider backend 308.

In one embodiment, the content provider customer account in the content provider customer profile database 502 may include a shadow account that is created for the purposes of being associated with the existing customer profile and account in the customer profile database 404. The identification and authentication controller 402 may associate the existing customer profile with the shadow account. Entitlement and subscription information corresponding to the customer may be stored in the shadow account and retrieved from the shadow account, as described below. The entitlement and subscription information may have been obtained from the existing customer profile, another account, or be based on predetermined configurations of subscription packages. The customer may not have direct access to the shadow account.

The customer profile database 404 can contain information related to customers of the article dispensing machines 230, including name, mailing and billing addresses, email addresses, phone and mobile numbers, username, password, payment methods, rental history, purchase history, preferred article dispensing machines, movie and video game genre preferences, customizations, subscriptions, parental controls, linked content provider accounts, content provider subscriptions and entitlements, and other data. A rental transaction can be personalized using information from the customer profile database 404 at the article dispensing machines 230 and a website interface 418. For example, only certain genres and titles of DVDs, Blu-Ray discs, or video games could be shown if a customer sets particular preferences that are then stored in the customer profile database 404. Some of the information stored in the customer profile database 404 may also be stored in the article dispensing machine database 282.

The website interface 418 can be interactive and accessible to a customer using web browser software at an electronic device 306. The website interface 418 may also include a mobile application or consumer electronics device application. Rentable media articles may be searched, browsed, and reserved on the website interface 418 for receipt at the article dispensing machines 230. The location of and the inventory at article dispensing machines 230 can be viewed at the website interface 418. Digital media selections from content providers, such as streaming, downloadable, and on-demand media, may also be searched, browsed, and accessed on the website interface 418. A customer can access their customer profile on the website interface 418 for purposes of verifying and updating their personal information in the customer profile database 404. For example, a customer can link an account they have with a content provider on the website interface 418 by specifying their username, password, account number, and/or other identifying information for the content provider account. The system backend 307 can utilize SAML (Security Assertion Markup Language), OAuth (Open Authentication), or other protocols to authenticate the identity of the customer at the content provider via a connection from the website interface 418 to the content provider identification and authentication controller 506 in the content provider backend 308, as shown in FIG. 5. If the identifying information matches the content provider account, the linkage to the content provider account can be stored in the customer profile database 404.

An inventory database 412 may contain a catalog of physical media articles that may be rented at the article dispensing machines 230 and reserved at the website interface 418 for later receipt at the article dispensing machines 230. A catalog of digital media selections available at the content provider can be contained in the metadata database 410. Metadata for each of the media articles and media selections are stored in the metadata database 410, including title, release date, running time, chapter information, technical details (resolution, audio options, languages, etc.), format, peripheral device requirements, number of players, online capability, actors, voice actors, director, studio, publisher, developer, platform, availability of downloadable content, episode information, genre, critic ratings, individualized ratings (reviews, recommendations, likes, etc.), parental ratings (MPAA, ESRB, TV Parental Guidelines, etc.), description, related content, media artwork, media stills, and other information.

Physical media articles that may be rented at the article dispensing machines 230 and digital media selections available at the content provider may be synchronized and mapped to one another by matching their respective metadata. As seen in FIG. 5, a synchronization and mapping engine 414 connected to the customer profile database 404, the metadata database 410, and the content provider asset management system 504 in the content provider backend 308 may compare the metadata for the media articles and media selections to determine matches. Metadata in the content provider asset management system 504 for media selections can be compared to metadata in the metadata database 410 to perform the matching. For example, a combination of a title, release date, running time, and/or actor information can be used to map a media article to a corresponding media selection. In one embodiment, proprietary identification codes unique to a media article and a media selection can be used to map the media article to the corresponding media selection. The proprietary identification codes for the media article and the media selection can be stored in the metadata database 410 and the content provider asset management system 504, respectively. Such proprietary identification codes can be assigned to media articles and media selections by third party providers such as Rovi, Baseline, and AMG.

Figure 6:
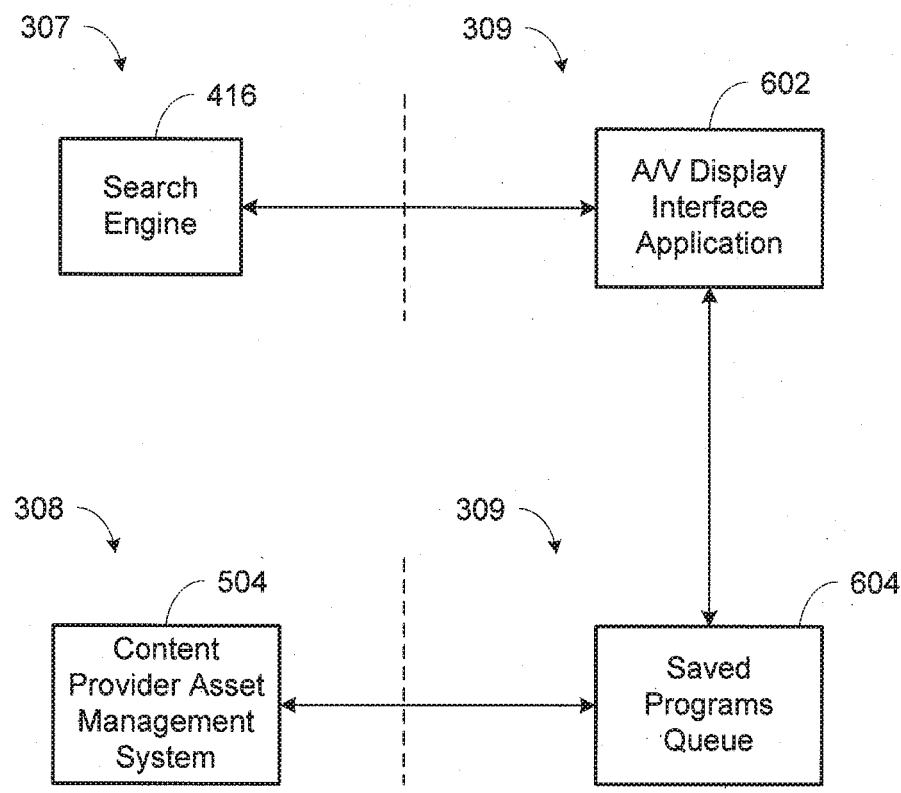
FIG. 6 is a block diagram illustrating connections between the system backend, the content provider backend, and the A/V display interface.

A media selection at a content provider can be placed in the saved programs queue 604 on the A/V display interface 309, as shown in FIG. 6, by providing the appropriate instructions to the content provider asset management system 504 in the content provider backend 308. Queuing a media selection may occur, for example, when a customer decides to purchase the digital media selection from the content provider in place of a physical media article at an article dispensing machine 230, as detailed further below.

An inventory database 412 can be connected to the article dispensing machine 230 and the metadata database 410 to provide information regarding the availability of media articles in the article dispensing machines 230. In conjunction with a search engine 416, the inventory database 412 and the metadata database 410 can provide inventory results for media articles and media selections to an A/V display interface application 602 on an A/V display interface 309, as shown in FIG. 6. Such results may include the availability of physical media articles at the article dispensing machines 230 as well as digital media selections available at a content provider. The results may also be provided to the website interface 418 or other websites operated by a content provider, for example. The synchronization and mapping engine 414 can store the information from the content provider asset management system 504 regarding media selections at the content provider in the metadata database 410. The inventory database 412 can also supply the availability of media articles in the article dispensing machines 230 to the website interface 418 or to other portals, such as an application on a mobile device, when queried.

A metadata database watcher 408 can monitor the metadata database 410 for changes in metadata, media articles, and/or media selections. The metadata database watcher 408 can use customer watchlist subscriptions from a customer profile in the customer profile database 404 to determine what changes to monitor. The changes to the metadata can include inventory availability, content provider availability, release schedules, and other information related to a particular title. The customer watchlist subscriptions can be used by the metadata database watcher 408 to monitor these changes in combination with information regarding particular actors, directors, and other information. When a change corresponding to a customer watchlist subscription is found by the metadata database watcher 408, a notification engine 406 can transmit notifications and details of the change to the customer. The notifications may be sent via email, SMS, mobile application alerts, set-top box notification, or other electronic channels.

A customer may also subscribe to be notified about new information regarding their favorite actors, directors, titles, studios, and other parameters. Such information may include information related to live performances, television appearances, news and magazine articles, blogs, and other content. A web crawler and data feed 420 can obtain this information by searching pertinent websites and use of a public API to feed the metadata database 410. The customer can subscribe to this information about their favorites at the website interface 418, for example. The metadata database watcher 408 monitoring the metadata database 410 can detect when there is a new piece of information about a favorite and transmit the desired notifications using the notification engine 406.

Figure 7:
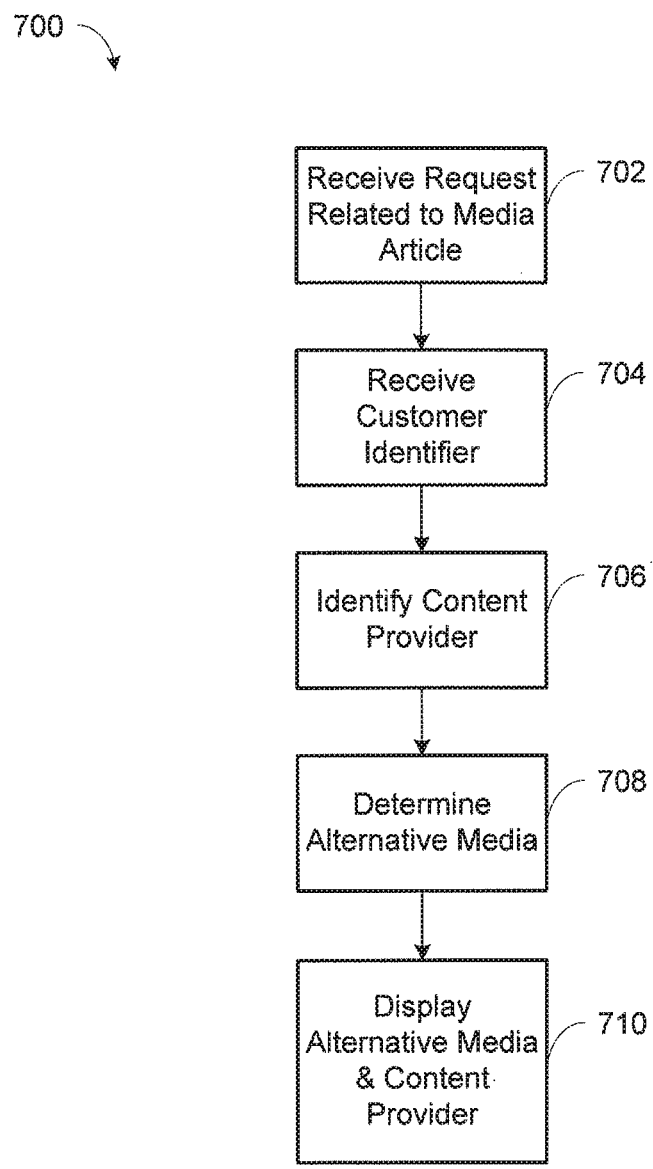
FIG. 7 is a flowchart illustrating an order of operations performed by an article dispensing machine for substituting alternative media for a media article.

A preferred embodiment of a process 700 for substituting a physical media article with a digital alternative media selection is shown in FIG. 7. The process 700 can result in display of the alternative media selection and an associated content provider on the article dispensing machine 230 when a media article is unavailable, such as when the media article is out-of-stock or already reserved during a rental transaction, or when a media article is available. At step 702, the article dispensing machine 230 can receive a request related to the media article through the user interface 234. The request may include a rental request, such as when a customer desires to rent an available or unavailable media article during a rental transaction; an information request, such as when a customer is browsing available media articles and wishes to display information about alternative media corresponding or related to a particular media article; or a browsing request, such as when a customer is browsing or searching for media articles and information about alternative media can be presented on the user interface 234 based on the customer's preferences.

For a rental request, the customer may request to rent a media article that is available to rent and in-stock in the article dispensing machine 230, or a media article that is unavailable because the media article is out-of-stock, reserved to another customer, or otherwise unavailable to rent from the article dispensing machine 230. In the case of an information request, the customer may be browsing media articles prior to deciding whether to rent. For a particular media article, the customer can optionally select to obtain information about alternative media corresponding to the media article. For a browsing request, the customer may also be browsing or searching for media articles prior to deciding whether to rent. Information about alternative media corresponding to or related to the media article being viewed can be displayed, based on a customer's preferences that are stored in the customer profile database 404. The preferences may include a particular genre, actor, director, studio, or other criteria.

At step 704, the article dispensing machine 230 can receive a unique customer identifier through the user interface 234, such as via the card reader 240 or the keypad and/or touch screen 242. The unique customer identifier is preferably a credit or debit card number obtained via a swipe of a credit or debit card in the card reader 240. The credit or debit card number may also be obtained using a Radio Frequency Identification (RFID) reader configured to read RFID-enabled credit cards. The credit or debit card number can be processed through a hash function on the article dispensing machine 230, and then the hashed credit or debit card number can be transmitted to the identification and authentication controller 402 in the system backend 307. The hashed credit or debit card number can be used to look up a customer profile in the customer profile database 404. The unique customer identifier may also include a customer-provided identification of the associated content provider. The customer could also provide what content providers they are associated with on the article dispensing machine 230, and optionally provide the specific subscription package they subscribe to, instead of a credit or debit card number or account number.

The associated content providers can be identified at step 706. Using the unique customer identifier provided at step 704, the associated content providers may be identified by accessing the customer profile database 404. A customer profile in the customer profile database 404 can contain linkages to customer accounts and subscriptions at content providers that the customer is associated with. The customer can provide what content providers they are associated with prior to commencing the rental transaction, such as on the website interface 418, and this information can be stored in the customer profile 404. If a customer does not have any existing linkages in the customer profile database 404 at step 706, the customer may identify the associated content providers, if any, via the user interface 234 on the article dispensing machine 230. The customer can provide account information, for example, or other unique information to identify a particular customer account at a content provider. In one embodiment, the operator of the associated content provider may be the same as the operator of the article dispensing machine 230. Details of step 706 are further described below with regards to FIG. 9.

At step 708, the central controller 302 can determine a digital alternative media selection to substitute for the physical media article. Mappings between the media article and a corresponding alternative media selection, based on their respective metadata, can be stored in the metadata database 410. The determination of the alternative media selection may be performed by the synchronization and mapping engine 414 in real time based on metadata in the metadata database 410, inventory information in the inventory database 412, and entitlement and subscription information in the customer profile database 404. Details of step 708 are further described below with regards to FIG. 10. The alternative media selection will be displayed at step 710 along with the content provider associated with the alternative media selection. In addition, the media article and related information may also be displayed at step 710 in the case of a rental request when the media article is available and in-stock, an information request, or a browsing request at step 702. For example, if the request at step 702 is a rental request, the customer may choose to rent the media article from the article dispensing machine 230 or access the alternative media selection. As another example, if the request at step 702 is an information request or a browsing request, the customer can view the available alternative media options along with the media article(s) available at the article dispensing machine 230.

Other information may be presented to the customer on the user interface 234 at step 710, such as payment options, subscription information, and other information related to the alternative media selection. In one embodiment, an email, SMS, or other communication may be sent to the customer with a uniform resource locator (URL) link to view the alternative media selection. In another embodiment, a QR code representing a URL link to view the alternative media selection may be displayed to the customer on the user interface 234. In another embodiment, an email, SMS, or other communication may be sent to the customer with details on how to view the alternative media selection, such as instructions about how to access a video-on-demand title on an A/V display interface 309. In another embodiment, the alternative media selection can be queued on the saved programs queue 604 on the A/V display interface 309 so that an application on the A/V display interface 309 can notify the customer of the availability of the alternative media selection when the application is executed. In further embodiments, the article dispensing machine 230 may communicate a URL link and/or instructions on how to view the alternative media selection to an electronic device 306 using near field communication, Bluetooth, USB, or another protocol. In another embodiment, the alternative media selection can be downloaded onto a USB flash drive connected to the article dispensing machine 230.

Figure 8:
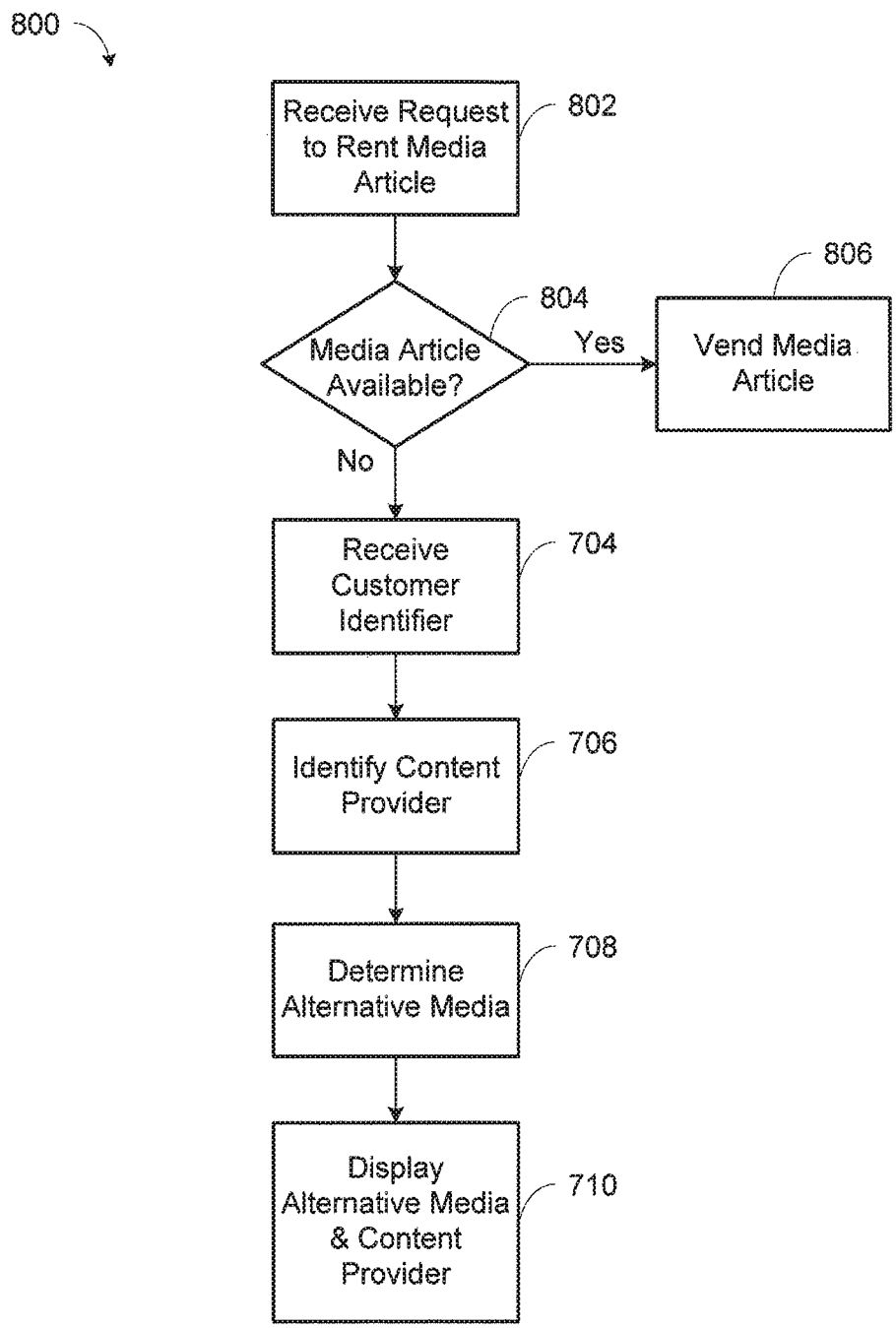
FIG. 8 is a flowchart illustrating an order of operations performed by an article dispensing machine for substituting alternative media for a media article in an alternative embodiment.

An alternative embodiment of a process 800 for substituting a physical media article with a digital alternative media selection is shown in FIG. 8. In this embodiment, a request to rent a media article is received at step 802. The media article may be unavailable because the media article is out-of-stock, reserved to another customer, or otherwise unavailable to rent from the article dispensing machine 230, or the media article may be available to rent and in-stock in the article dispensing machine 230. For example, the customer may search and/or browse through DVD, Blu-Ray, and video game titles on the user interface 234 of the article dispensing machine 230 and attempt to rent a certain media article. At step 804, it is determined whether the desired media article is available to rent at the article dispensing machine 230 by accessing the inventory database 412. If the desired media article is available, i.e., in-stock, then the media article is vended to the customer at step 806. However, if the desired media article is not available, then the process 800 continues to step 704. As described above with reference to the process 700 shown in FIG. 7, at step 704, a customer identifier can be received, followed by identifying the associated content provider at step 706. At step 708, alternative media corresponding to the unavailable media article is determined, followed by display of the alternative media and the associated content provider at step 712. When a corresponding alternative media selection is found at step 708, the customer can be notified via the user interface 234 that the desired media article is not available for rental but that an alternative media selection is available at step 712.

Figure 11:
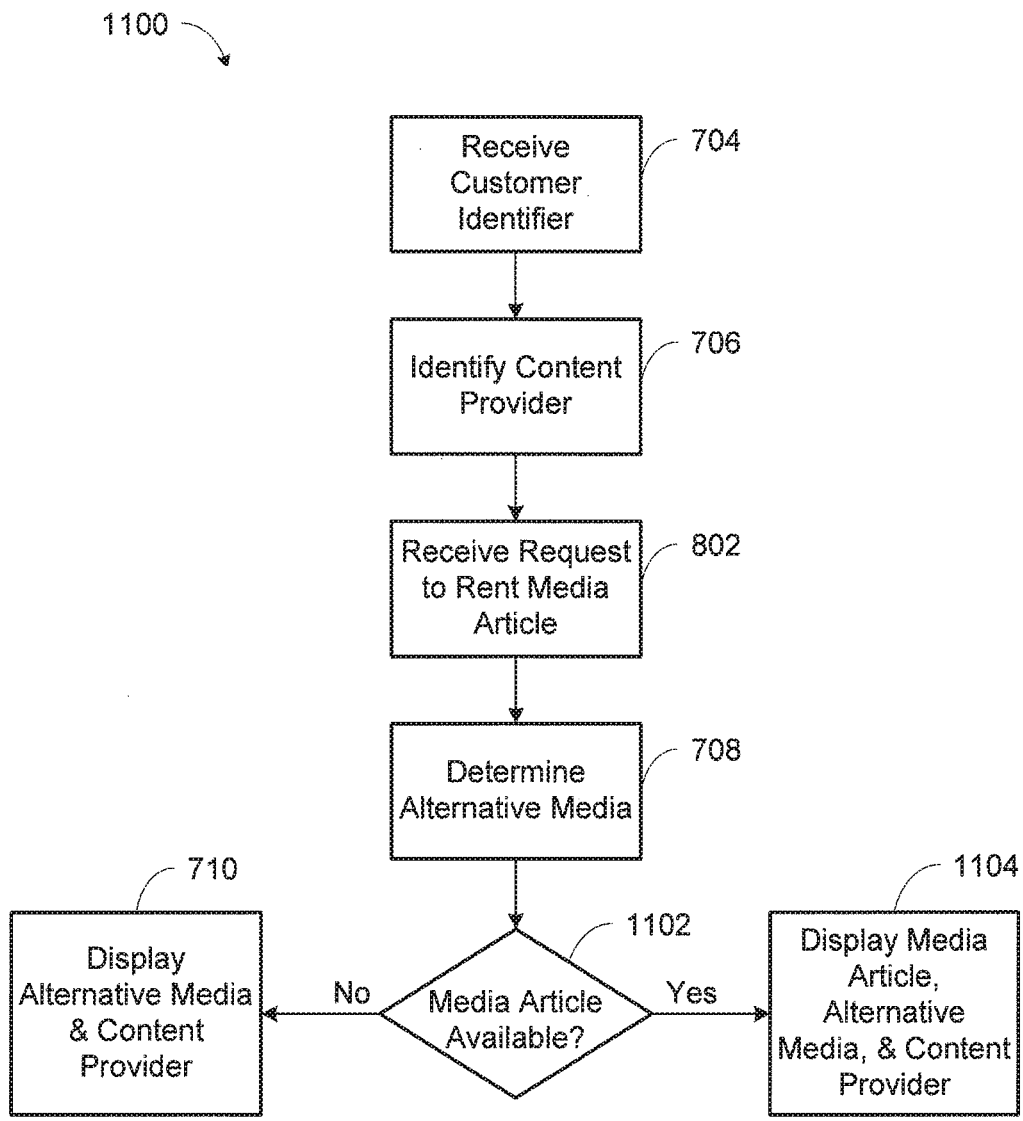
FIG. 11 is a flowchart illustrating an order of operations performed by an article dispensing machine for substituting alternative media for a media article in a further alternative embodiment.

In an alternative embodiment, a process 1100 shown in FIG. 11 can result in display of the alternative media selection and an associated content provider on the article dispensing machine 230 when a media article is unavailable, or can result in display of the media article, the alternative media selection, and the associated content provider on the article dispensing machine 230 when the media article is available. As in the process 700 described in FIG. 7 above, a unique customer identifier can be received by the article dispensing machine 230 at step 704, followed by identification of the associated content providers at step 706. At step 802 following step 706 in the process 1100, a request can be received by the article dispensing machine 230 and the central controller 302 to rent a desired media article. At step 708 in the process 1100 following step 802, the central controller 302 can determine an alternative media selection that corresponds to the desired media article, based on their respective metadata. Next, at step 1102 following step 708 in the process 1100, it is determined whether the desired media article is available to rent at the article dispensing machine 230 by accessing the inventory database 412. If the desired media article is not available at step 1102, then the alternative media selection and associated content provider are displayed on the user interface 234 at step 710. However, if the desired media article is determined to be available at step 1102, then the desired media article, the alternative media selection, and the associated content provider for the alternative media selection are displayed on the user interface 234 at step 1104.

Figure 9:
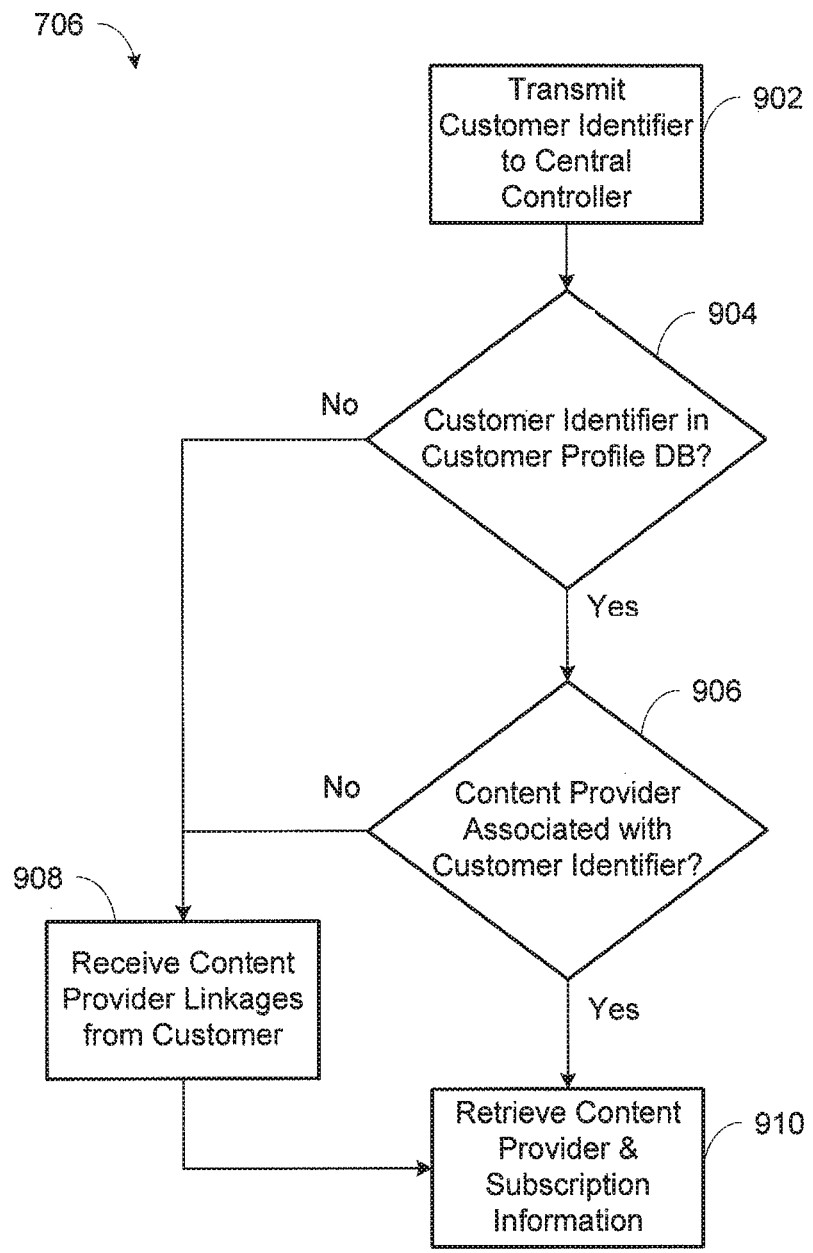
FIG. 9 is a flowchart illustrating an order of operations performed by an article dispensing machine for linking a content provider with a customer identifier in the substitution operations of FIGS. 7, 8, and 11.

A preferred embodiment of step 706 in the processes 700, 800, and 1100 above for identifying a content provider with a unique customer identifier is shown in FIG. 9. At step 902, the unique customer identifier received at step 704 is transmitted to the central controller 302. The central controller 302 can match the unique customer identifier to a particular customer profile in the customer profile database 404. If the unique customer identifier is present in the customer profile database 404 at step 904, then the process continues to step 906. At step 906, the central controller 302 can determine whether there is an associated content provider linked to the customer profile found in step 904. The customer profile in the customer profile database 404 may contain a linkage to an associated content provider. If there is not a content provider associated to the customer profile at step 906 or if no unique customer identifier is found in the customer profile database 404 at step 904, the customer may provide the linkages of content providers at step 908 via the user interface 234. The customer profile in the customer profile database 404 can include information obtained from the content provider customer profile database 502 in the content provider backend 308, such as an account number, email address, subscription information, and other information related to the customer's content provider customer profile.

In one embodiment, the content provider customer account in the content provider customer profile database 502 may include a shadow account that is created for the purposes of being associated with an existing customer profile and account in the customer profile database 404. The identification and authentication controller 402 may associate the existing customer profile with the shadow account. Entitlement and subscription information corresponding to the customer may be stored in the shadow account and retrieved from the shadow account, as described below. The entitlement and subscription information may have been obtained from the existing customer profile, another account, or be based on predetermined configurations of subscription packages.

If there is a content provider associated with the customer identifier at step 906, the process continues to step 910 where subscription information at the content provider for the customer is retrieved from the customer profile database 404. The customer profile database 404 may contain subscription and entitlement information that was previously received from the content provider customer profile database 502 in the content provider backend 308. Subscription information at the content provider can include the customer's subscribed service package, premium channel content the customer entitled to access, zip code and address for possible geographical content restrictions, parental authorization and controls for age authentication, and other subscriber information. The subscription information may be used by the central controller 302 at step 708 when determining the availability of alternative media selections for the customer at particular content providers. Step 910 is also performed following step 908 when a customer has entered a linkage to a content provider.

Figure 10:
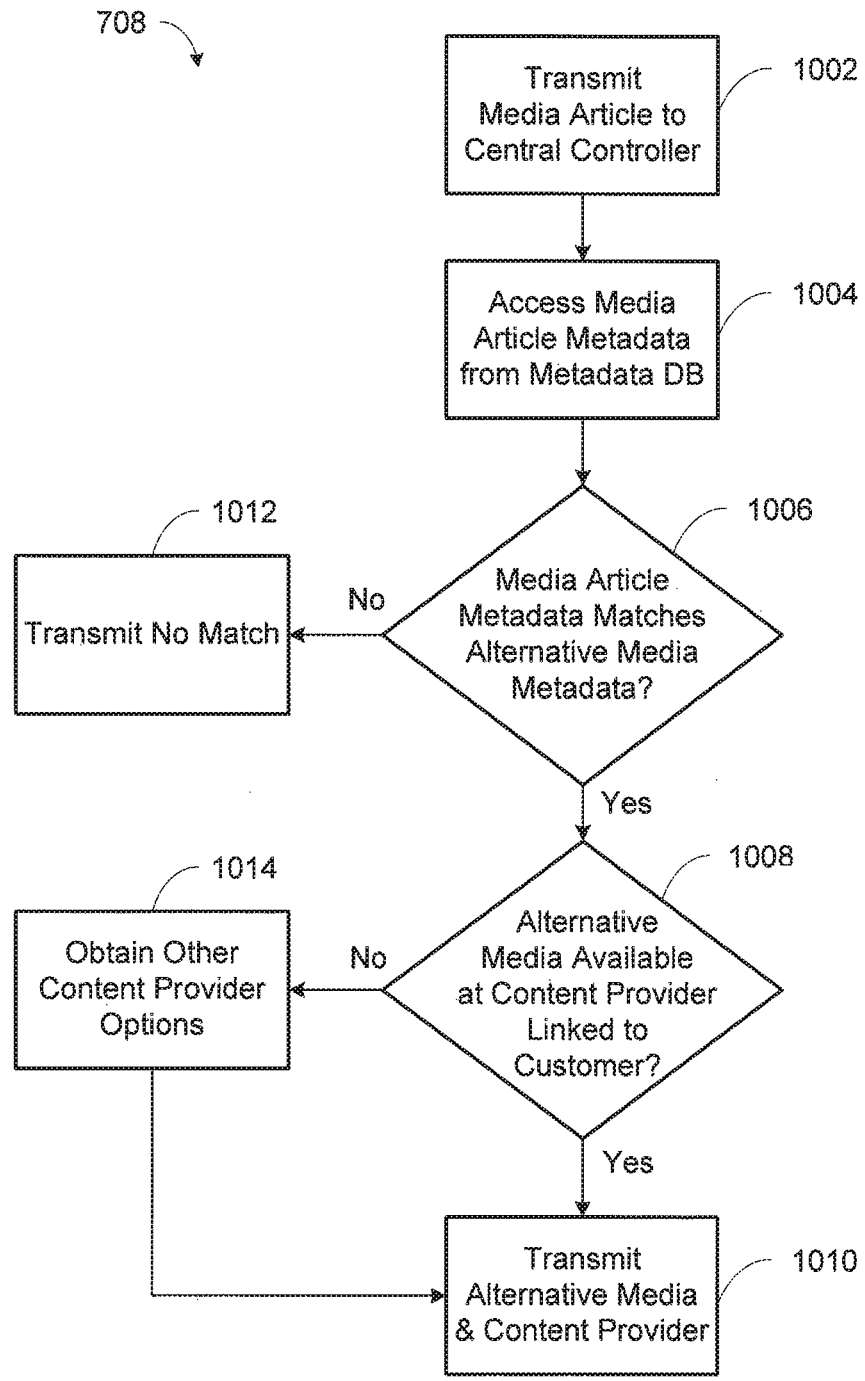
FIG. 10 is a flowchart illustrating an order of operations performed by an article dispensing machine for mapping alternative media to a media article in the substitution operations of FIGS. 7, 8, and 11.

A preferred embodiment of step 708 in the processes 700, 800, and 1100 above for determining the digital alternative media selection in place of the physical media article is shown in FIG. 10. At step 1002, the desired media article the customer wishes to rent is transmitted to the central controller 302. The synchronization and mapping engine 414 can access metadata for the desired media article at step 1004 from the metadata database 410. As discussed above, metadata for each of the media article and the alternative media selection may include title, release date, running time, chapter information, technical details, format, peripheral device requirements, number of players, online capability, actors, voice actors, director, studio, publisher, developer, platform, availability of downloadable content, episode information, genre, critic ratings, individualized ratings, parental ratings, description, related content, media artwork, media stills, and other information, proprietary identification code, and other information. At step 1006, the synchronization and mapping engine 414 can determine whether the metadata for the media article matches the metadata for an alternative media selection in the metadata database 410. For example, a combination of the title of a movie and the release year may allow a match of a movie DVD or Blu-Ray disc to a streaming movie, downloadable movie, or video-on-demand movie that may be available from a content provider. As another example, a combination of the title of a television series, the episode title, episode number, and release year may allow a match of a television show DVD or Blu-Ray disc to a media selection available from a content provider. As a further example, a combination of the title of a video game, release date, and publisher may allow a match of a video game to a streaming or downloadable game from a content provider. In the case of a movie or television show, if a match between the desired media article and the alternative media is not found with the title, episode, and/or release year information, the synchronization and mapping engine 414 could also utilize the running time of the movie or television show and the names or initials of the top-billed actors. It will be understood that metadata in any combination may be used to obtain a mapping of media articles to alternative media.

In some embodiments, the synchronization and mapping engine 414 can determine a match of a media article to a related alternative media selection at step 1006, instead of or in addition to determining the alternative media selection that exactly matches the media article. The rental or purchase history of the customer from the customer database 404 may also be utilized in conjunction with the metadata of the media article, as described above, to determine a related alternative media selection. An exact alternative media selection may not be available to a customer due to the unavailability of the physical media article in digital format at any content provider, due to the entitlements in the customer's subscription package, or other reasons. If an exact alternative media selection match to the media article is not available, then a related alternative media selection may be determined at step 1006. For example, if a customer attempts to rent the movie Return of the Jedi and it is unavailable as a physical media article at the article dispensing machine 230 and as a digital media selection at all content providers, then related alternative media selections may be determined, such as the movies The Empire Strikes Back and Star Wars Episode I: The Phantom Menace. The related alternative media selections may be determined based on metadata for the movie Return of the Jedi and/or the prior rental history of the customer that may include, for example, rentals of the movie Star Wars and the video game Star Wars: Battlefront.

If no match between a media article and an alternative media is found at step 1006, the central controller 302 may transmit to the user interface 234 of the article dispensing machine 230 that there was no alternative media selection found that corresponds to the media article at step 1012. However, if a match is found at step 1006, the synchronization and mapping engine 414 determines at step 1008 whether the alternative media selection is available at a content provider that is linked to the customer. The content provider linkages may have been supplied previously at step 706 and in particular, steps 906, 908, and 910. The synchronization and mapping engine 414 determines whether an alternative media selection is available at a linked content provider by accessing information about possible digital media selections in the metadata database 410. In addition to determining whether the alternative media selection is available at a linked content provider, the synchronization and mapping engine 414 can also determine at step 1008 whether the customer is entitled to access the alternative media selection based on the subscription information in the customer profile database 404 that was previously obtained at step 910.

A customer may be entitled to access an alternative media selection for free, such as when the alternative media selection is already available within the customer's subscription package, or when the alternative media selection is publicly available. In other cases, a customer may only have access to an alternative media selection by providing additional payment, such as when the customer's subscription package does not allow access to the alternative media selection or when the alternative media selection is only available at an a la carte content provider. For example, if the customer's subscription package allows access to Home Box Office (HBO) content and the alternative media selection is available through HBO, then the customer will have access to the alternative media selection without additional payment. As another example, if the customer's subscription package only allows access to Showtime content and the alternative media selection is only available through HBO, then the customer will not have access to the alternative media selection. In this case, the customer may have the option to upgrade their subscription package to include HBO or utilize an a la carte content provider for an additional payment. As a further example, if the customer is a Comcast subscriber and the alternative media selection is available as a free video-on-demand selection on Comcast, then the customer will have access to the alternative media selection without additional payment. However, if the alternative media selection is only available through Hulu Plus, then the customer will not have access to the alternative media selection unless the customer provides additional payment.

Therefore, if the alternative media selection is available at a linked content provider at step 1008, then at step 1010, the alternative media selection and associated content provider is transmitted from the central controller 302 for display on the article dispensing machine 230. If the alternative media selection is not available at a linked content provider at step 1008, then the central controller 302 can obtain other content provider options, if any, at step 1014. In one embodiment, step 1014 may be performed to obtain other content provider options even if the alternative media selection is available at a linked content provider at step 1008. Other content provider options may include a la carte content providers such as Amazon Instant Video, iTunes Store, YouTube, VUDU, and other services that allow a user to individually purchase digital media without requiring a subscription. Further content provider options that may be obtained at step 1014 include retailers that grant rights to a digital media selection in conjunction with the purchase of a physical item (e.g., Best Buy, Walmart, etc.), movie studios, television networks, video game developers, and online gaming delivery services (Xbox Live, PlayStation Network, OnLive, etc.). For example, a video game may be available from an online gaming delivery service for download, such as from Xbox Live or the PlayStation Network, or for streaming, such as from OnLive. If other content providers are available for the alternative media selection at step 1014, the alternative media selection and the associated other content provider(s) may be transmitted at step 1010 from the central controller 302 for display on the article dispensing machine 230.

As described above, following step 708, the alternative media selection, associated content provider, and payment options may be displayed to the customer at step 710. The payment options may be dependent on the subscription information obtained at step 910 or the a la carte content providers obtained at step 1014. The payment options can include whether the alternative media selection is free to the customer, is free to the customer because of their subscription service package with a content provider, or will cost a particular price or number of credits. In one embodiment, the price for the alternative media selection may be discounted to the customer compared to the retail price. In another embodiment, the customer may also redeem a promotion code to gain access to the alternative media selection. In a further embodiment, the payment option may include the opportunity to upgrade to a higher level service package which includes access to the alternative media selection. The customer may pay for the alternative media selection at the article dispensing machine 230 using a credit or debit card, redeeming credits or promotion codes, charging the price to their account at the content provider, or using other payment methods.

Any process descriptions or blocks in figures should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those having ordinary skill in the art.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the present invention and protected by the following claims.

The invention claimed is:

1. A method of substituting an alternative media selection for a requested media selection requested from a first content provider, the selection being performed at a user interface connected to a processor and configured to communicate with a central processor via a network, the method comprising the steps of:
   receiving a request for the requested media selection;
   receiving a unique customer identifier through the user interface;
   identifying an associated content provider of digital media based on the unique customer identifier;
   comparing first metadata corresponding to the requested media selection with second metadata corresponding to the alternative media selection; and
   selecting, for presentation in substitution of the requested media selection, the alternative media selection from available media provided by the associated content provider based on the comparison, the alternative media selection comprising digital media content and being different from the requested media selection.

2. The method of claim 1, wherein the request related to the requested media selection comprises a rental request for a media article.

3. The method of claim 2, further comprising determining if the media article is available at an article dispensing machine, in response to the request; and
   wherein the steps of receiving the unique customer identifier, identifying the associated content provider, comparing the first metadata to the second metadata, and selecting the alternative media selection are performed, if the requested media selection is determined to be unavailable at the article dispensing machine.

4. The method of claim 1, wherein the request related to the requested media selection comprises an information request to display media information related to the alternative media selection.

5. The method of claim 1, wherein:
the request related to the requested media selection comprises a browsing request for the media article, wherein the browsing request comprises at least one of browsing or searching for the requested media selection; and
selecting the alternative media selection comprises determining the alternative media selection related to the requested media selection based on a user preference.

6. The method of claim 1, wherein the unique customer identifier comprises at least one of a credit card number, a debit card number, or a customer-provided identification of the associated content provider.

7. The method of claim 1, wherein identifying the associated content provider comprises associating the unique customer identifier with a customer subscription at the associated content provider, wherein the customer subscription is stored in a customer profile database in communication with the central processor.

8. The method of claim 7, wherein selecting the alternative media selection comprises determining the alternative media selection based on an access permission for the alternative media selection in the customer subscription.

9. The method of claim 1, wherein selecting the alternative media selection comprises utilizing a mapping of the requested media selection to the alternative media selection based on the first metadata corresponding to the requested media selection and second metadata corresponding to the alternative media selection, the first metadata corresponding to the requested media selection and the second metadata corresponding to the alternative media selection stored in a metadata database in communication with the central processor, and wherein the selected alternative media selection comprises a related media article in digital format.

10. The method of claim 9, wherein the first metadata corresponding to the requested media selection and the second metadata corresponding to the alternative media selection each comprises at least one of a title, a release date, a running time, chapter information, technical details, a format, a peripheral device requirement, number of players, online capability, an actor, a voice actor, a director, a studio, a publisher, a developer, a platform, availability of downloadable content, episode information, a genre, a critic rating, an individualized rating, a parental rating, a description, related content, media artwork, a media still, or a proprietary identification code.

11. The method of claim 1, wherein the requested media selection comprises at least one of a digital video disc, a Blu-Ray disc, a video game disc, a video on demand, a streaming video, a downloadable video, a streaming video game, or a downloadable video game.

12. The method of claim 1, wherein the alternative media selection comprises at least one of a video on demand, a streaming video, a downloadable video, a streaming video game, or a downloadable video game.

13. The method of claim 1, further comprising transmitting a list to the user interface, the list comprising the alternative media selection, the associated content provider, and a payment option for the alternative media selection.

14. The method of claim 13, further comprising:
receiving a request through the user interface to purchase the alternative media selection; and
redeeming at least one of a promotion code, a discount, or a credit code to purchase the alternative media selection.

15. The method of claim 13, wherein the payment option comprises at least one of a discount on a regular price for the alternative media selection, a charge for the alternative media selection to the associated content provider, redemption of a promotion code, redemption of a credit code, or an offer to upgrade to a premium customer subscription.

16. The method of claim 1, wherein identifying the associated content provider comprises receiving an identification of the associated content provider through the user interface.

17. The method of claim 1, wherein identifying the associated content provider comprises receiving a linkage of the associated content provider to a customer account for the first content provider through a website interface in communication with the central processor.

18. A system for substituting an alternative media selection for a requested media selection from user interface for a first content provider, the user interface connected to a processor, the system comprising:
a memory storing executable program code;
a central processor configured to communicate with the processor of the first content provider via a network, and configured to execute the executable program code stored on the memory to:
receive a unique customer identifier received through the user interface in connection with a request related to the requested media selection;
identify an associated content provider based on the unique customer identifier; and
determine the alternative media selection at the associated content provider based on first metadata corresponding to the requested media selection and second metadata corresponding to the alternative media selection, the alternative media selection comprising digital media content corresponding to the requested media selection.

19. The system of claim 18, wherein the request related to the requested media selection comprises a rental request for a media article.

20. The system of claim 19, further configured to execute the executable program code stored on the memory to:
determine if the media article is available at an article dispensing machine, in response to the request; and
wherein receiving the unique customer identifier, identifying the associated content provider, comparing the first metadata to the second metadata, and selecting the alternative media selection are performed, if the requested media selection is determined to be unavailable at the article dispensing machine.

* * * * *